US012762950B2

(12) United States Patent
Yamaguchi et al.

(10) Patent No.: US 12,762,950 B2
(45) Date of Patent: Oct. 13, 2026

(54) VEHICLE TRAFFIC CONTROL SYSTEM

(71) Applicant: SUBARU CORPORATION, Tokyo (JP)

(72) Inventors: Fumihito Yamaguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 256 days.

(21) Appl. No.: 18/716,855

(22) PCT Filed: Oct. 25, 2022

(86) PCT No.: PCT/JP2022/039638
§ 371 (c)(1),
(2) Date: Jun. 5, 2024

(87) PCT Pub. No.: WO2024/089754
PCT Pub. Date: May 2, 2024

(65) Prior Publication Data
US 2026/0162530 A1 Jun. 11, 2026

(51) Int. Cl.
*G08G 1/00* (2006.01)
*G08G 1/01* (2006.01)
(Continued)

(52) U.S. Cl.
CPC ..... *G08G 1/096725* (2013.01); *G08G 1/0112* (2013.01); *G08G 1/0145* (2013.01);
(Continued)

(58) Field of Classification Search
CPC ........... G08G 1/096725; G08G 1/0112; G08G 1/0145; G08G 1/096775; G08G 1/164; G08G 1/166; G08G 1/00
(Continued)

(56) References Cited

U.S. PATENT DOCUMENTS 9,552,731 B2 * 1/2017 Sakata .................. G08G 1/166
10,847,035 B2 * 11/2020 Kobayashi ........... G01C 21/362
(Continued)

FOREIGN PATENT DOCUMENTS

JP 2005-56372 A 3/2005
JP 2021-111340 A 8/2021
WO 2021/038741 A1 3/2021

OTHER PUBLICATIONS

Office Action dated Oct. 22, 2024, in corresponding Japanese Patent Application No. 2024-517155, 6 pages.
(Continued)

*Primary Examiner* — Shardul D Patel
(74) *Attorney, Agent, or Firm* — Rimon P.C.

(57) ABSTRACT

In a server apparatus of a traffic control system, a pre-processor records a position of a vehicle in a database. A control information generator periodically generates individual control information regarding vehicles by using information in the database, and transmits the individual control information. Each vehicle controls travel of the subject vehicle by using the individual control information. In the server apparatus, an emergency processor is implemented when a vehicle that is to perform emergency evacuation to a road shoulder is present, sets passage regulation regions around the position of the vehicle, and updates the passage regulation regions. The control information generator generates and transmits the individual control information for deceleration or a stop for a vehicle that is likely to travel in the passage regulation regions in the database, and generates and transmits the individual control information for evacuation for the vehicle that performs the emergency evacuation.

15 Claims, 13 Drawing Sheets

(51) Int. Cl.
*G08G 1/0967* (2006.01)
*G08G 1/16* (2006.01)

(52) U.S. Cl.
CPC ....... *G08G 1/096775* (2013.01); *G08G 1/164* (2013.01); *G08G 1/166* (2013.01)

(58) Field of Classification Search
USPC .......................................................... 701/117
See application file for complete search history.

(56) References Cited

U.S. PATENT DOCUMENTS

| | | | | |
|---|---|---|---|---|
| 2004/0193347 | A1* | 9/2004 | Harumoto .............. | G08G 1/166<br>701/45 |
| 2021/0084710 | A1* | 3/2021 | Sutherland ............ | H04W 4/021 |
| 2021/0201677 | A1* | 7/2021 | Oyama ................ | G08G 1/0116 |
| 2022/0277651 | A1 | 9/2022 | Yuta et al. | |

OTHER PUBLICATIONS

International Search Report received in PCT Application No. PCT/JP2022/039638, dated Jan. 17, 2023.

* cited by examiner

[ FIG. 9 ]
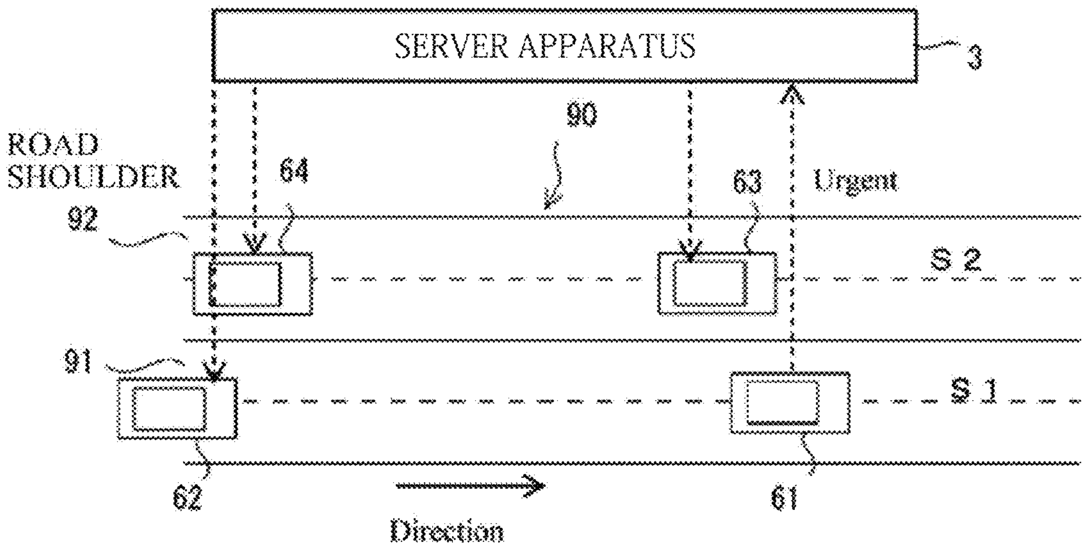
[ FIG. 10 ]
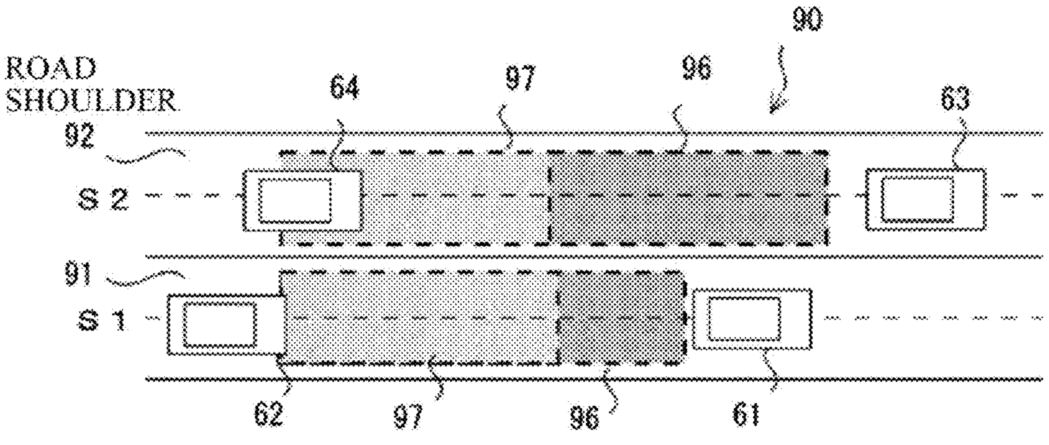

[ FIG. 11 ]
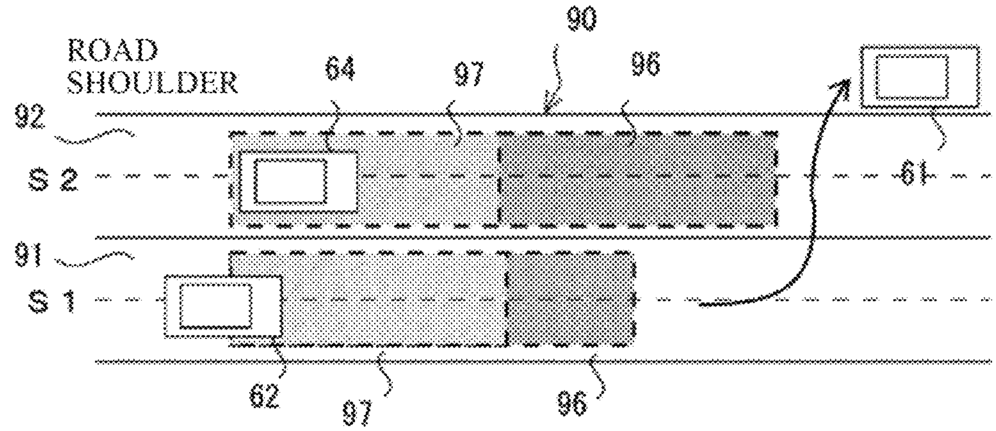
[ FIG. 12 ]
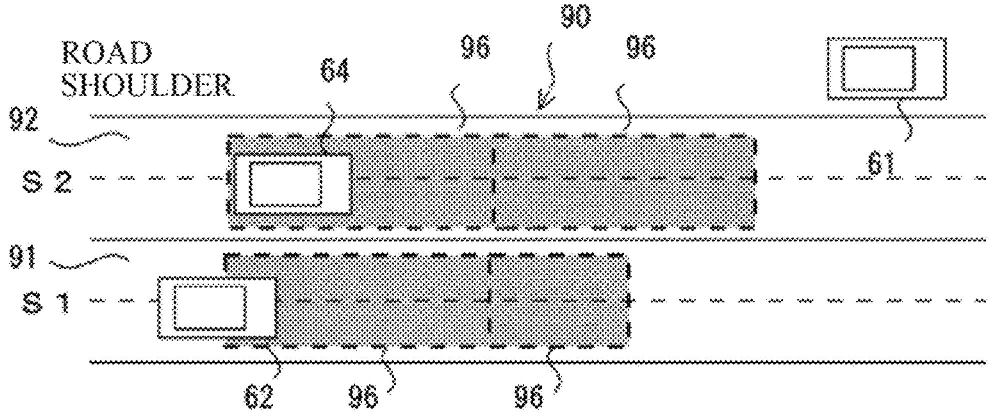

[ FIG. 13 ]
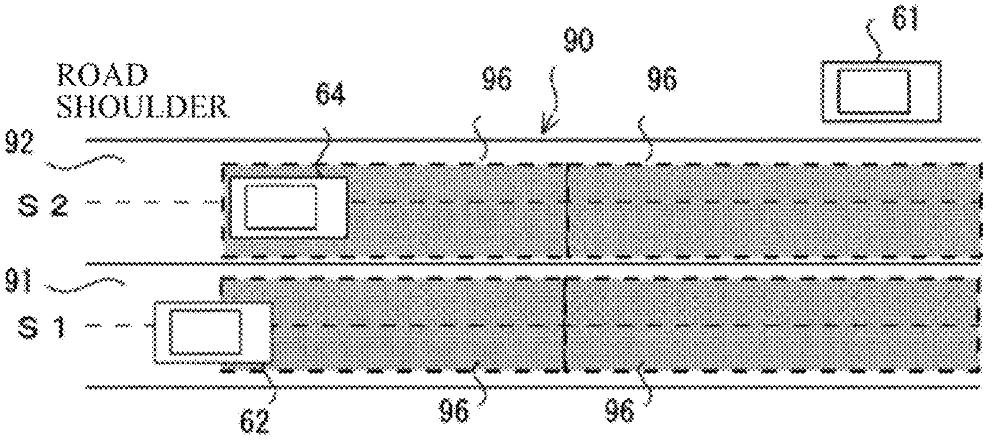
[ FIG. 14 ]
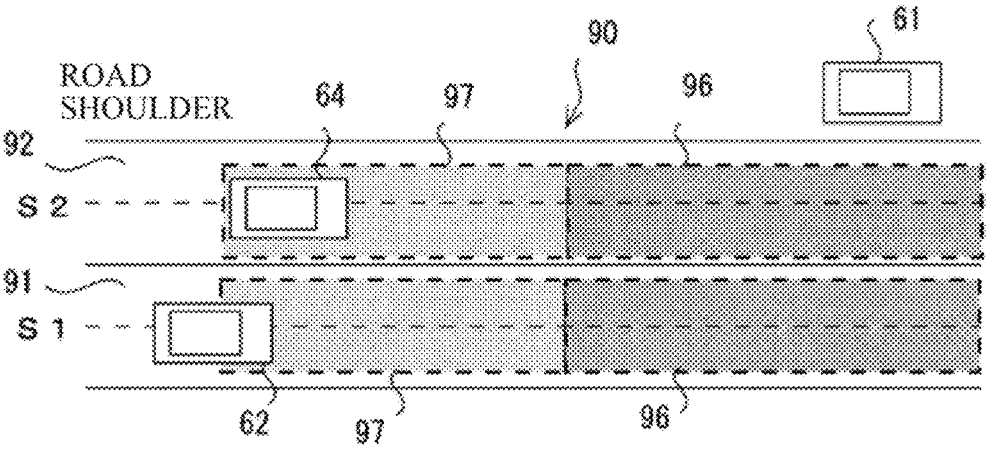

[ FIG. 15 ]
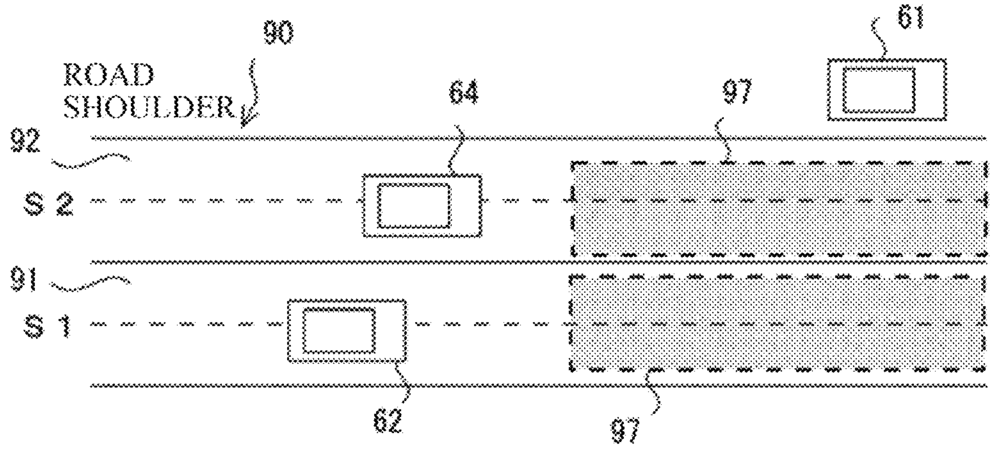
[ FIG. 16 ]
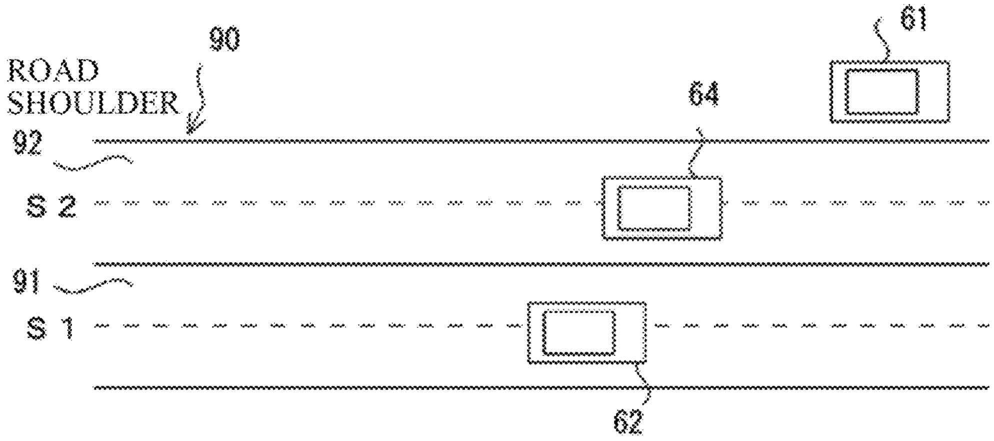

VEHICLE TRAFFIC CONTROL SYSTEM

CROSS-REFERENCE TO RELATED APPLICATIONS

This application is the U.S. National Phase under 35 U.S.C. § 371 of International Application No. PCT/JP2022/039638, filed on Oct. 25, 2022.

TECHNICAL FIELD

The invention relates to a vehicle traffic control system.

BACKGROUND ART

For vehicles including automobiles, an automated driving technique has been developed that detects a travel state of a vehicle based on, for example, a captured image by a vehicle outside camera provided in the subject vehicle, and controls travel of the subject vehicle by using the detection information.

However, when controlling the travel of the subject vehicle based on detection information of a subject-vehicle sensor such as the vehicle outside camera provided in the subject vehicle, the travel control is basically a control based on information in a visual field of the subject vehicle.

Hence, a server apparatus may collect travel information regarding multiple vehicles, generate an individual control value for each vehicle based on, for example, positions of the multiple vehicles, and transmit the individual control values to the multiple vehicles.

In addition, Patent Literature 1 proposes a lane change route instructing apparatus that is provided in a vehicle and generates and delivers an individual travel route for each vehicle regarding surrounding multiple vehicles.

When using the server apparatus or the lane change route instructing apparatus, it is possible for each vehicle to control the travel of the subject vehicle, based on the control value or the travel route obtained based on information unobtainable in a visual field of the subject vehicle. In addition, it is expected that each vehicle and another vehicle around each vehicle basically achieve smooth and stable travel with less sudden changes without interfering with each other.

CITATION LIST

Patent Literature

Patent Literature 1: International Publication No. WO 2021/038741

SUMMARY OF INVENTION

Problem to be Solved by the Invention

However, when one server apparatus or one lane change route instructing apparatus as in Patent Literature 1 generates an individual travel route or an individual control value for all vehicles under the control of the server apparatus or the lane change route instructing apparatus, it is predicted that excessive processing loads are easily placed on the apparatuses. Both of the apparatuses seem to be difficult to employ for a wider control range.

In particular, when the lane change route instructing apparatus provided in one vehicle as in Patent Literature 1 intends to generate the individual travel route for not only the subject vehicle but also surrounding multiple other vehicles, the lane change route instructing apparatus is to have a processing capability unnecessarily high for only the vehicle including the lane change route instructing apparatus. Providing each vehicle with such a high processing capability exerts direct influence on a selling price of each vehicle.

In addition, a vehicle traveling on a road or a lane thereof can be involved in an emergency situation while the vehicle is traveling. For example, a physical condition of one of occupants can deteriorate, or a minor malfunction can occur in the vehicle.

Upon occurrence of such an emergency situation, it is desired that a vehicle traveling on a lane of a road evacuate to a road shoulder and stop.

A vehicle and a server apparatus are to favorably cope with such a case where a vehicle that is to perform emergency evacuation to a road shoulder is present.

As described above, in a travel control of a vehicle, it is desirable to achieve automated driving of the vehicle, to reduce processing loads on a vehicle and a server apparatus used together with the vehicle, and to make it possible to cope with a vehicle that is to perform emergency evacuation to a road shoulder if any.

Means for Solving the Problem

An aspect of the invention provides a vehicle traffic control system including vehicles and a server apparatus. The vehicles each includes a travel controller configured to generate a control value to control travel of the vehicle as a subject vehicle. The server apparatus is configured to generate individual control information regarding each of the vehicles based on travel information regarding the vehicles, and transmit the individual control information to the vehicles. The travel controller of each of the vehicles is configured to, upon receiving the individual control information addressed to the subject vehicle from the server apparatus, generate the control value for a travel control of the subject vehicle by using the received individual control information addressed to the subject vehicle. The server apparatus includes a server communication device, a database, a pre-processor, a control information generator, and an emergency processor. The server communication device is configured to receive the travel information from each of the vehicles. The database is configured to accumulate and hold the travel information regarding each of the vehicles. The pre-processor is configured to, when the server communication device receives the travel information, record, in the database, information regarding at least a travel position of the vehicle related to the travel information. The control information generator is configured to periodically generate the individual control information regarding each of the vehicles by using the information held in the database. The emergency processor is configured to be implemented when the travel information received by the server communication device includes information indicating that the vehicle that has transmitted the travel information is to perform emergency evacuation to a road shoulder. The pre-processor is configured to cause an interruption when the travel information received by the server communication device includes the information indicating that the vehicle is to perform the emergency evacuation to the road shoulder. The emergency processor is configured to, upon being implemented when the vehicle that is to perform the emergency evacuation to the road shoulder is present, be implemented preferentially over the control information generator, by the interruption being caused by the pre-processor, identify an on-road position of the vehicle that is to perform the emergency evacuation to the road shoulder, and record and set a passage regulation region for prohibition or suppression of travel of another vehicle in the database, for at least a range including a rear side in a travel direction with respect to the identified on-road position of the vehicle. The control information generator is configured to generate and transmit the individual control information for deceleration or a stop, for a vehicle that is likely to travel in the passage regulation region held in the database, in periodic processing.

Effects of the Invention

The invention uses the server apparatus to control the travel of the vehicles. Each of the vehicles includes the travel controller that generates the control value to control the travel of the vehicle as the subject vehicle.

In addition, the server apparatus generates the individual control information regarding each of the vehicles based on the travel information regarding the vehicles, and transmits the individual control information to the vehicles. When the travel controller of each of the vehicles receives the individual control information addressed to the subject vehicle from the server apparatus, the travel controller of each of the vehicles generates the control value for the travel control of the subject vehicle by using the received individual control information addressed to the subject vehicle. In this manner, by utilizing the travel controller provided in the vehicles, it is possible for the server apparatus to perform a traffic control on the travel of the vehicles, without generating an individual control value different between vehicles regarding the vehicles. Even if a control range of the server apparatus widens or the number of vehicles to be controlled increases, it is possible for the server apparatus to perform the traffic control on the travel of the vehicles with a lower processing load, as compared with a case of generating the individual control value for each vehicle.

Moreover, the server apparatus in the invention includes the database that accumulates and holds the travel information regarding each of the vehicles. The pre-processor of the server apparatus records, when the receiving device receives the travel information, the information regarding at least the travel position of the vehicle related to the travel information, in the database. In addition, the control information generator of the server apparatus periodically generates the individual control information regarding each of the vehicles by using the information held in the database. In contrast, the emergency processor of the server apparatus is implemented when the travel information received by the receiving device includes the information that hinders the travel of the other vehicle. Accordingly, when no situation that hinders travel of vehicles has occurred, the pre-processor and the control information generator are implemented in the server apparatus. Periodic processing in a normal operation of the server apparatus increases or decreases in accordance with the number of vehicles to be controlled. A processing capability of the server apparatus is easily determinable based on the number of vehicles assumed in its control range. In addition, it is expected to be possible for the server apparatus to stably keep generating, without failure, the individual control information for each of the vehicles.

Upon occurrence of the vehicle that is to perform the emergency evacuation to the road shoulder, it is possible for the server apparatus in the invention to implement the emergency processor based on the travel information received by the server communication device. The emergency processor that is implemented when the vehicle that is to perform the emergency evacuation to the road shoulder is present identifies the on-road position of the vehicle that is to perform the emergency evacuation to the road shoulder, and records and sets the passage regulation region for prohibition or suppression of the travel of the other vehicle in the database, for at least the range including the rear side in the travel direction with respect to the identified on-road position of the vehicle. In addition, the control information generator generates and transmits the individual control information for deceleration or a stop, for the vehicle that is likely to travel in the passage regulation region held in the database. It is possible for the travel controller of the vehicle that is likely to travel in the passage regulation region to generate the control value for the travel control of the subject vehicle, in accordance with a traffic control request received from the server apparatus. For example, it is possible for the travel controller of the vehicle involved in a situation that hinders the travel of the subject vehicle to control the travel of the subject vehicle for deceleration or a stop, to cope with the situation. The vehicle that is likely to travel in the passage regulation region is expected to travel in accordance with the passage regulation region held in the database. In this manner, setting the passage regulation region in the server apparatus makes it less likely for the other vehicle to pass, by normal travel, by the vehicle that is to perform the emergency evacuation.

In addition, even in a case of coping with such a situation that hinders the travel of the vehicles, the server apparatus does not have to generate the individual control value for each vehicle. Processing contents of and the processing load on the server apparatus upon occurrence of the situation that hinders the travel of the vehicles tend not to be excessive as compared with in the normal operation with no situation that hinders the travel of the vehicles.

As described above, the invention makes it possible to achieve automated driving of a vehicle, to reduce processing loads on a vehicle and a server apparatus used together with the vehicle, and to make it possible to cope with a vehicle that is to perform emergency evacuation to a road shoulder if any.

BRIEF DESCRIPTION OF DRAWINGS

FIG. 9 is an explanatory diagram of a travel environment in which a first automobile traveling on a two-lane road is involved in an emergency situation that necessitates road shoulder evacuation.

FIG. 10 is an explanatory diagram of a passage regulation region set on the road for the first automobile to evacuate to a road shoulder, after occurrence of the emergency situation in FIG. 9.

FIG. 11 is an explanatory diagram of the road shoulder evacuation of the first automobile in a state where the passage regulation region in FIG. 10 is set.

FIG. 12 is an explanatory diagram of a state where the passage regulation region in FIG. 10 is updated.

FIG. 13 is an explanatory diagram of the passage regulation region expanded by update after the first automobile evacuates to the road shoulder.

FIG. 14 is an explanatory diagram of a state where the expanded passage regulation region in FIG. 13 is updated.

FIG. 15 is an explanatory diagram of a state where the passage regulation region in FIG. 14 is further updated.

FIG. 16 is an explanatory diagram of a state where all the passage regulation regions in FIG. 15 are cancelled by update.

MODES FOR CARRYING OUT THE INVENTION

Some embodiments of the invention are described below based on the drawings.

First Embodiment

Figure 1:
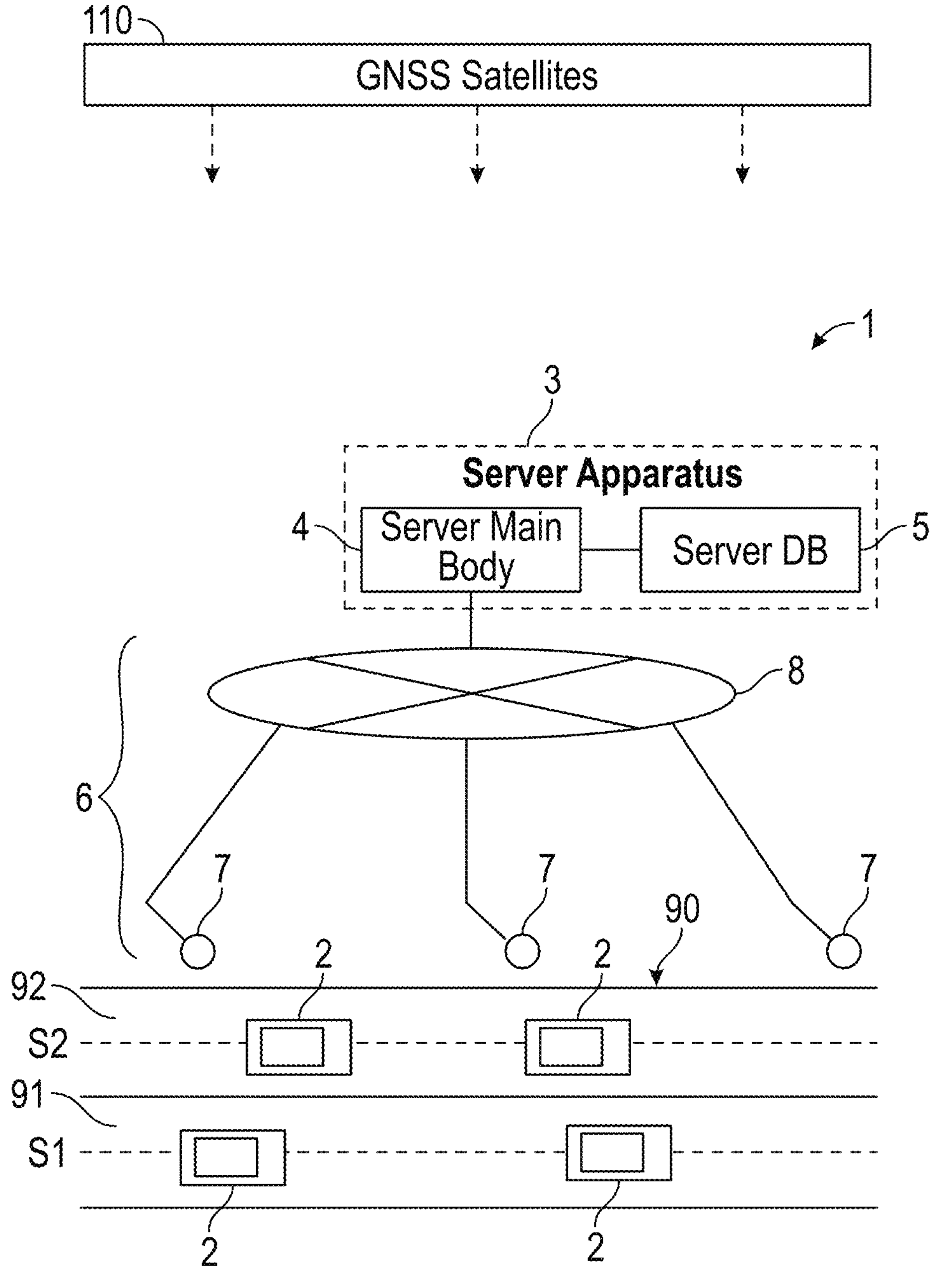
FIG. 1 is a configuration diagram of a vehicle traffic control system according to a first embodiment of the invention.

FIG. 1 is a configuration diagram of a vehicle traffic control system 1 according to a first embodiment of the invention.

The traffic control system 1 in FIG. 1 includes multiple automobiles 2 and a server apparatus 3. The multiple automobiles 2 travel on a road 90. The server apparatus 3 transmits and receives information to and from the multiple automobiles 2 through a communication system 6.

Here, the automobiles 2 are an example of vehicles. Other examples of the vehicles include trucks, buses, motorcycles, and personal mobilities. In FIG. 1, the multiple automobiles 2 travel on the two-lane road 90 including a first lane 91 and a second lane 92.

The communication system 6 includes multiple base stations 7 and a communication network 8. The multiple base stations 7 are arranged along the road 90. To the communication network 8, the multiple base stations 7 are coupled. The base stations 7 may be, for example, those for commercial 5G or those for an advanced transportation system such as ADAS (Advanced driver-assistance systems). The communication network 8 may include, for example, a carrier communication network that provides the base stations for 5G, or the Internet coupled to the carrier communication network.

The server apparatus 3 includes a server main body 4 and a server DB (server database) 5. The server main body 4 is coupled to the communication network 8 of the communication system 6. The server DB 5 is coupled to the server main body 4. Basically, the server apparatus 3 may be coupled to the Internet of the communication system 6. The server apparatus 3 may be coupled to the carrier communication network. In addition, the server apparatus 3 may include not one server main body 4 but multiple server main bodies 4 that execute a control distributively in cooperation with each other. The multiple server main bodies 4 may be hierarchized, for example. The multiple server main bodies 4 at the lowermost layer in the hierarchy may be distributively coupled to the carrier communication network in accordance with, for example, each region thereof. Such server main bodies 4 may be implemented by, for example, control devices of the base stations for 5G.

The server apparatus 3 in FIG. 1 executes a traffic control on the multiple automobiles 2 in a control range configured by zones of at least three base stations 7 in the drawing.

Furthermore, FIG. 1 illustrates GNSS (Global Navigation Satellite System) satellites 110. The GNSS satellites 110 broadcast signals including information regarding their positions and the time, to the ground. A GNSS receiver is able to obtain information regarding a position and the time of the GNSS receiver by receiving the signals of the multiple GNSS satellites. The position and the time of each GNSS receiver are usable as probable position and time less likely to have errors with respect to the position and the time of another GNSS receiver.

Figure 2:
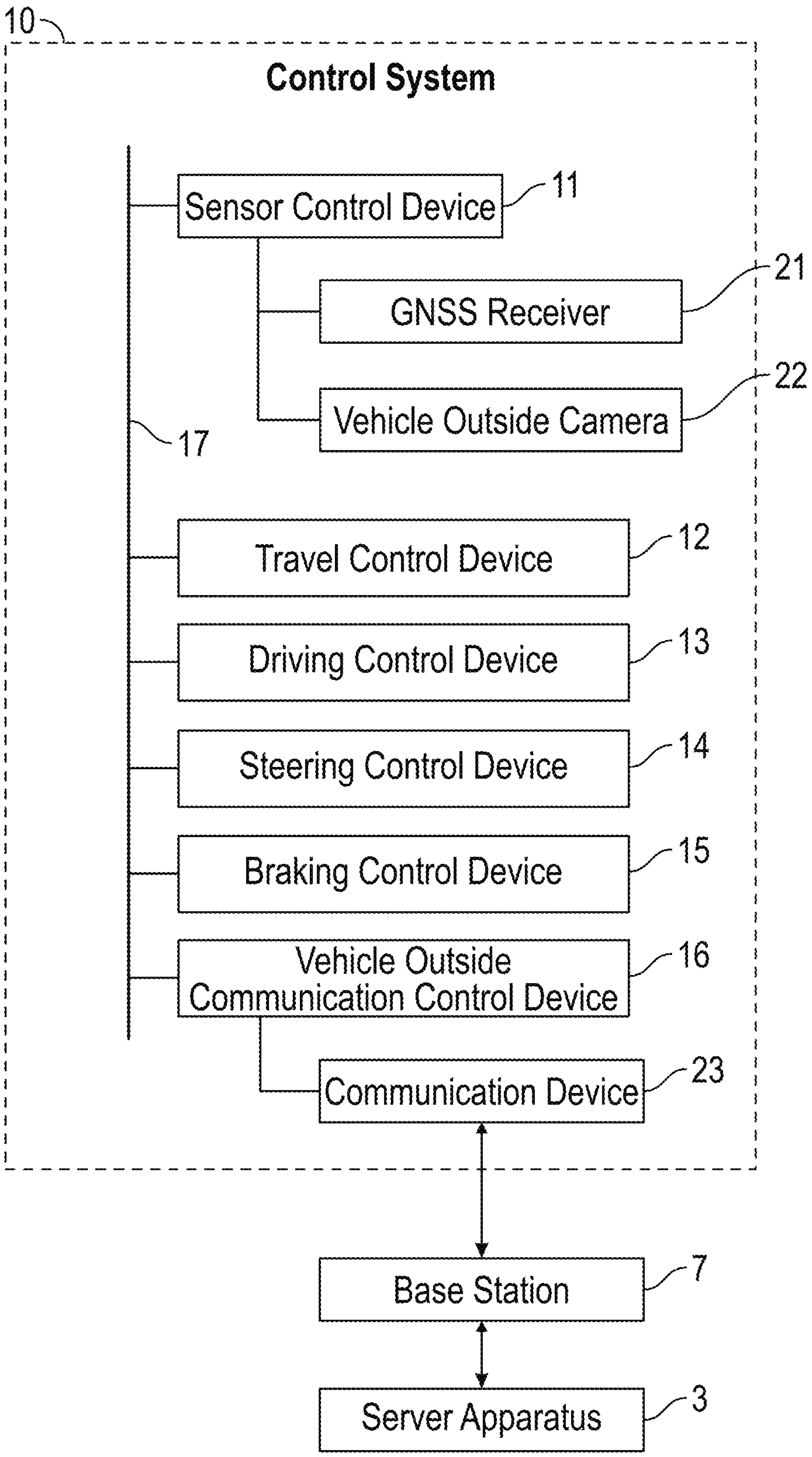
FIG. 2 is an explanatory diagram of a control system of an automobile in FIG. 1.

FIG. 2 is an explanatory diagram of a control system 10 of the automobile 2 in FIG. 1. The multiple automobiles 2 illustrated in FIG. 1 may include the control system 10 in FIG. 2.

The control system 10 of the automobile 2 in FIG. 2 includes a vehicle network 17 and multiple control devices coupled thereto. The control device may basically include a CPU (Central Processing Unit), a memory, a timer, an input-output unit, and an internal bus to which these are coupled. The input-output unit is coupled to the vehicle network 17. A controller is implemented in the control device by the CPU executing a program held in the memory. FIG. 2 illustrates, as the multiple control devices, a sensor control device 11, a travel control device 12, a driving control device 13, a steering control device 14, a braking control device 15, and a vehicle outside communication control device 16. The control system 10 of the automobile 2 may include other control devices, for example, an operation control device or the like.

The vehicle network 17 may be those for vehicles, e.g., the CAN (Controller Area Network) or the LIN (Local Interconnect Network). The vehicle network 17 may include a commonly used network such as the IEEE (Institute of Electrical and Electronics Engineers) 802.3 or the IEEE 802.11. By using such a vehicle network 17, it is possible for each of the control devices to be supplied with information from, and output information to other control devices through the vehicle network 17.

The sensor control device 11 controls operation of various subject-vehicle sensors provided in the automobile 2. The sensor control device 11 outputs detection information of the various subject-vehicle sensors or processed information to other control devices through the vehicle network 17. In FIG. 2, to the sensor control device 11, a GNSS receiver 21 and a vehicle outside camera 22 are coupled, as examples of the subject-vehicle sensors. In addition, a vehicle speed sensor, a steering sensor, an acceleration sensor, and the like may be coupled to the sensor control device 11. The vehicle speed sensor detects a speed of the automobile 2. The steering sensor detects a steering wheel angle of an unillustrated steering wheel of the automobile 2. The acceleration sensor detects an acceleration rate of the automobile 2. By using a sensor that detects acceleration rates in three axial directions as the acceleration sensor, it is possible for the sensor control device 11 to generate information regarding angular acceleration rates in yaw, pitch, and roll directions of the automobile 2.

The GNSS receiver 21 generates information regarding a position and the time of the automobile 2.

The vehicle outside camera 22 captures an image of the surroundings of the automobile 2 traveling on, for example, the road 90. The vehicle outside camera 22 may be a monocular camera, a compound-eye camera, or a 360-degree camera. It is desirable that the vehicle outside camera 22 be able to capture at least a frontward view of the traveling automobile 2. The sensor control device 11 may generate information regarding relative distances and directions of other automobiles around the subject vehicle based on the captured image by the vehicle outside camera 22.

To the vehicle outside communication control device 16, a communication device 23 is coupled. The communication device 23 is provided in the automobile 2. The communication device 23 establishes a wireless communication path with the base station 7 with which communication is available. The vehicle outside communication control device 16 controls operation of the communication device 23, and transmits and receives information to and from the server apparatus 3 through the communication device 23 and the base station 7. For example, the vehicle outside communication control device 16 outputs information received by the communication device 23 from the server apparatus 3 or the base station 7, to another control device through the vehicle network 17. The vehicle outside communication control device 16 transmits information inputted from another control device through the vehicle network 17, to the server apparatus 3 through the communication device 23 and the base station 7.

The driving control device 13 is coupled to members of a drive system provided in the automobile 2, e.g., an engine, a motor, and a transmission. The engine generates a driving force by using, for example, gasoline or hydrogen as fuel. The motor generates a driving force by electric power. The driving control device 13 controls operation of these members of the drive system based on control values acquired through the vehicle network 17.

The steering control device 14 is coupled to, for example, a steering device provided in the automobile 2. The steering control device 14 controls operation of the steering device based on the control value acquired through the vehicle network 17.

The braking control device 15 is coupled to a brake device provided in the automobile 2. The braking control device 15 controls operation of the brake device based on the control value acquired through the vehicle network 17.

The travel control device 12 controls travel of the automobile 2. When causing the automobile 2 to travel by automated driving without an operation by an occupant, the travel control device 12 acquires information regarding a travel state of the subject vehicle and information regarding the surroundings of the subject vehicle from the sensor control device 11, and generates the control value corresponding to the information.

For example, when determining that another moving body is approaching ahead of the subject vehicle based on the latest captured image by the vehicle outside camera 22, the travel control device 12 generates the control value for the braking control device 15, to cause the subject vehicle to decelerate or stop.

When determining, based on the latest captured image by the vehicle outside camera 22, that the stopped subject vehicle is ready to start, the travel control device 12 generates the control value for the driving control device 13, to cause the subject vehicle to accelerate.

When, based on the latest captured image by the vehicle outside camera 22, the subject vehicle is about to deviate from the lane on which the subject vehicle is traveling, the travel control device 12 generates the control value for the steering control device 14, to change a travel direction of the subject vehicle.

In addition, when the travel control device 12 compares the position of the GNSS receiver 21 with high-precision map data and determines that the subject vehicle has to turn right, turn left, or make a lane change, the travel control device 12 generates the control value for the steering control device 14, to change the travel direction of the subject vehicle.

By such autonomous determination and control based on detection by the subject-vehicle sensors, it is possible for the travel control device 12 to cause the automobile 2 to travel by the automated driving.

Figure 3:
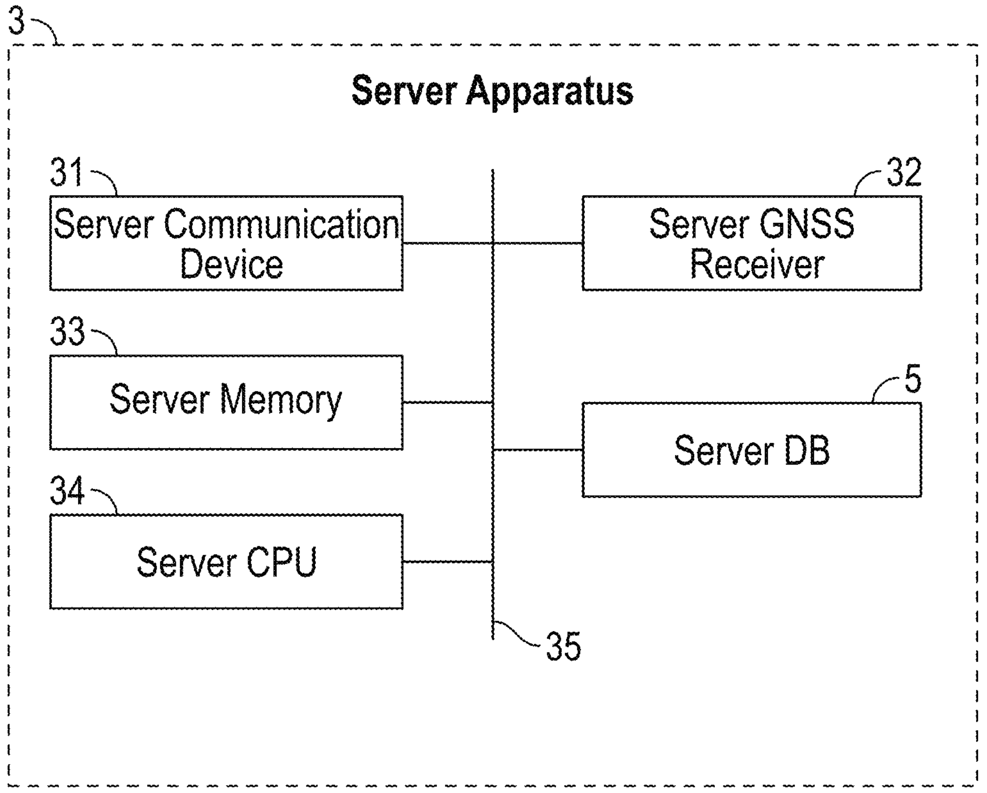
FIG. 3 is a hardware configuration diagram of a server apparatus in FIG. 1.

FIG. 3 is a hardware configuration diagram of the server apparatus 3 in FIG. 1.

The server apparatus 3 in FIG. 3 includes a server communication device 31, a server GNSS receiver 32, the server DB (server database) 5, a server memory 33, a server CPU 34, and an internal bus 35 to which these are coupled.

The server communication device 31 is coupled to the communication network 8 of the communication system 6. The server communication device 31 transmits and receives information to and from the communication device 23 provided in the automobile 2. The server communication device 31 may receive travel information from each of the multiple automobiles 2.

The server GNSS receiver 32 generates information regarding a position and the time of the server apparatus 3. The time generated by the server GNSS receiver 32 may be highly accurately identical with the time generated by the GNSS receiver 21 of each automobile 2.

The server DB 5 accumulates and holds various kinds of data to be used by the server apparatus 3 for the traffic control of the multiple automobiles 2. The server DB 5 may include, for example, the server map data 51, a road regulation DB (road regulation database) 52, a vehicle position behavior DB (vehicle position behavior database) 53, and the like, as described later.

The server memory 33 holds data such as programs to be executed by the server CPU 34.

The server CPU 34 reads and executes the programs held in the server memory 33. Thus, in the server apparatus 3, a controller that controls operation of the server apparatus 3 is implemented. The controller may have, for example, functions including a pre-processor 41, a control information generator 42, and an emergency processor 43, as described later.

Now, when using the server apparatus 3 to control travel of the multiple automobiles 2, there are an idea of controlling the travel of each automobile 2 by a remote control, and an idea of controlling the travel of each automobile 2 by the traffic control.

In the remote control, the server apparatus 3 generates and transmits a control value to be used by each automobile 2 for the control thereof as an individual control value. In this case, it is desired that the server apparatus 3 process the travel state or a travel environment of each of the multiple automobiles 2 by its own processing, and generate the individual control value suitable for the travel of each automobile 2.

In contrast, in the traffic control, the server apparatus 3 generates and transmits individual control information corresponding to the travel state of each automobile 2. Here, the individual control information indicates, for example, a request related to a travel control of the automobile 2 that prevents interference with other automobiles.

Such individual control information may be information indicating a request for, for example, acceleration, speed keeping, deceleration, a stop, a speed range (an upper limit and a lower limit), lane keeping, or a lane change of each automobile 2. The individual control information may, for example, include these pieces of information as values of flags. Unlike the individual control value directly usable by, for example, the driving control device 13 in each automobile 2, the individual control information may be information to be used by the travel control device 12 of each automobile 2 to generate a control value for the travel control thereof.

In the remote control, each automobile 2 receives the individual control value received from the server apparatus 3, and gives the individual control value to, for example, the driving control device 13 of the subject vehicle. The travel of each automobile 2 is thus controlled by the server apparatus 3. It is possible for each automobile 2 to control the travel of the subject vehicle, based on the individual control value obtained based on information, such as a remote travel environment, unobtainable in a visual field of the subject vehicle. It seems that each automobile 2 and another automobile around each automobile 2 achieve smooth and stable travel with less sudden changes without interfering with each other, as compared with a case of controlling the travel based on only the information of the subject-vehicle sensors.

However, in the remote control, a high processing load is placed on the server apparatus 3. The server apparatus 3 that executes the remote control has to, for example, map the information collected from the multiple automobiles 2 on the server map data 51 or the like, determine interference based on the mapped information, generate a course of each automobile 2 for suppression of the interference, and generate the individual control value usable by each automobile 2 based on the course. When using the server apparatus 3 to remotely control the travel of the multiple automobiles 2, the number of the processable automobiles 2 tends to be limited, even if the server CPU 34 with a high processing capability is used. It is not easy to employ the server apparatus 3 for the remote control for a wide control range where a large number of the automobiles 2 are likely to travel.

For this reason, in the present embodiment, the traffic control is employed as the control by the server apparatus 3, instead of the remote control. The server apparatus 3 for the traffic control may, without generating the individual control value for each automobile 2, generate and transmit information generated in a stage prior thereto as the individual control information. The server apparatus 3 for the traffic control may generate, as the individual control information, the information regarding the request related to the travel control of the automobile 2 described above. However, the server apparatus 3 is limited in its processing capability even if the server apparatus 3 employs the traffic control.

Moreover, even in a case of employing the traffic control, it is desired that the server apparatus 3, upon occurrence of, for example, a situation that hinders the travel of the automobiles 2 on the road 90 on which the multiple automobiles 2 travel, generate the information regarding the request related to the travel control of the automobile 2 to cope with the situation.

For example, the automobile 2 can malfunction to stop on a road. In addition, the occupant can alight from the automobile 2 stopped on a road. Upon occurrence of such events, it is desired that the server apparatus 3 generate and transmit the individual control information for each automobile 2, to allow each automobile 2 to control the travel to cope with the event.

In addition, the automobile 2 traveling on the road 90 or the lanes 91 and 92 thereof can be involved in an emergency situation while the automobile 2 is traveling. For example, a physical condition of one of the occupants can deteriorate, or a minor malfunction can occur in the automobile 2.

Upon occurrence of such an emergency situation, it is desired that the automobile 2 traveling on the lanes 91 and 92 of the road 90 evacuate to a road shoulder of the road 90 and stop.

The automobile 2 and the server apparatus 3 are to favorably cope with emergency evacuation of the automobile 2 involved in such an emergency situation to the road shoulder.

As described above, in the travel control of the automobile 2, it is desirable to achieve the automated driving of the automobile 2, to reduce processing loads on the automobile 2 and the server apparatus 3 used together with the automobile 2, and to make it possible to cope with the automobile 2 that is to perform emergency evacuation to a road shoulder if any.

Figure 4:
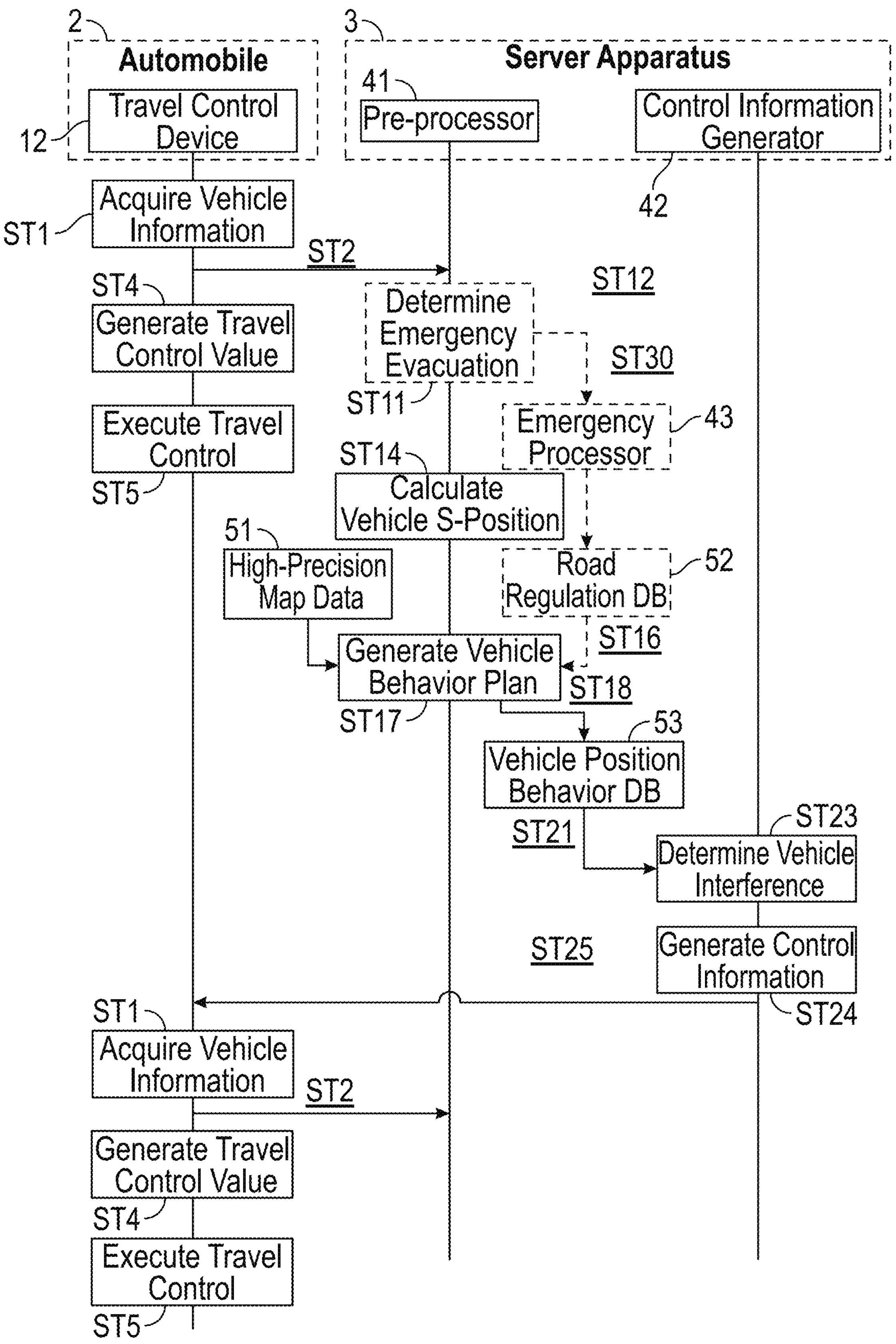
FIG. 4 is a timing chart of a traffic control on travel of multiple automobiles in the traffic control system in FIG. 1.

FIG. 4 is a timing chart of the traffic control on the travel of the multiple automobiles 2 in the traffic control system 1 in FIG. 1. Note that FIG. 4 illustrates only one automobile 2 in relation to the drawing.

FIG. 4 illustrates the travel control device 12 provided in the automobile 2, and the pre-processor 41, the control information generator 42, and the emergency processor 43 implemented in the server apparatus 3. Time flows from top to bottom.

In addition, FIG. 4 illustrates the server map data 51, the road regulation DB 52, and the vehicle position behavior DB 53, as the server DB 5 of the server apparatus 3. These may be held in the server DB 5 of the server apparatus 3.

Here, processing indicated by solid lines in FIG. 4 is executed for a basic traffic control by the pre-processor 41 and the control information generator 42. In contrast, processing indicated by dashed lines is processing that is executed, only upon occurrence of the automobile 2 that performs emergency evacuation to a road shoulder, to cope with the automobile 2.

Step numbers of respective processes in FIG. 4 correspond to those in FIGS. 5 to 8 described later.

The server map data 51 may be the server map data 51 regarding the road 90 on which the automobile 2 are able to travel, e.g., the road 90. The server map data 51 generally may be high-precision map data including, for example, information regarding each lane of the road 90, and detailed information regarding intersections. For example, FIG. 1 illustrates the road 90 including the multiple lanes 91 and 92. As for such a road 90, the server map data 51 may include information regarding a first line segment S1 coupling the middle of the first lane 91, and information regarding a second line segment S2 coupling the middle of the second lane 92. As described above, by using the server map data 51 including detailed information regarding the road 90, it is possible for the server apparatus 3 to identify not only the road on which each automobile 2 is traveling but also the lane on which each automobile 2 is traveling and a position on the lane, regarding, for example, the multiple automobiles 2 traveling on the road 90.

When the server communication device 31 receives new travel information, the pre-processor 41 basically records information regarding at least a travel position of the automobile 2 related to the traveling information, in the vehicle position behavior DB 53.

Thus, the vehicle position behavior DB 53 basically holds positions and behavior of the multiple vehicles traveling in a region controlled by the server apparatus 3. It is desirable that the vehicle position behavior DB 53 hold information regarding, for example, the positions of all the automobiles 2 under the control of the server apparatus 3, including those regarding which no individual control information is to be generated. For example, an intersection camera for the ADAS is able to capture an image of basically all the automobiles 2 passing through an intersection. Based on such information, the vehicle position behavior DB 53 may hold, for example, the positions of all the automobiles 2 under the control of the server apparatus 3. Thus, the vehicle position behavior DB 53 accumulates and holds the travel information regarding all the automobiles 2 under the control of the server apparatus 3. In addition, in the vehicle position behavior DB 53, the travel information regarding the multiple automobiles 2 may be associated with identification information issued for each automobile 2.

The control information generator 42 basically periodically generates and transmits the individual control information different between the automobiles 2, regarding each of the multiple automobiles 2, by using the information held in the vehicle position behavior DB 53.

The emergency processor 43 is implemented only when the automobile 2 that is to perform emergency evacuation to the road shoulder of the road 90 occurs, in the travel information newly received by the communication device 23.

Here, a situation in which the automobile 2 that is to perform emergency evacuation to the road shoulder of the road 90 occurs may be, for example, a case where the physical condition of one of the occupants deteriorates, or a minor malfunction occurs in the automobile 2.

The emergency processor 43 basically identifies the position, on the road 90, of the automobile 2 that is to perform emergency evacuation to the road shoulder, and records, with respect to the position, a passage regulation region for prohibition or suppression of travel of other vehicles, in the road regulation DB 52.

Thus, the road regulation DB 52 holds regulation information regarding the road 90 on which the multiple automobiles 2 travel. The road regulation DB 52 holds passage regulation information including a passage prohibition region 96 and a passage warning region 97 described later.

In addition, the road regulation DB 52 may hold, for example, traffic regulation information not included in the travel information transmitted from each automobile 2. For example, the advanced transportation system or the like generates traffic regulation information corresponding to a situation of the road 90. Such traffic regulation information or the like may also be held in the road regulation DB 52. In this manner, the road regulation DB 52 may hold quasi-dynamic information regarding the road 90 at present.

In such a traffic control system 1, basically, the server apparatus 3 is able to repeatedly generate multiple pieces of the individual control information to control the travel of the multiple automobiles 2 traveling under the control, by a control by the pre-processor 41 and the control information generator 42. In the automobile 2 that receives the individual control information, the travel control device 12 of the automobile 2 is able to generate the control value following a request in the individual control information, by using the individual control information received from the server apparatus 3, and control the travel of the subject vehicle by the automated driving. The multiple automobiles 2 execute the travel control basically following the control of the server apparatus 3, under the control of the server apparatus 3. This makes it possible for the multiple automobiles 2 to safely travel without causing interference with each other.

For example, as indicated by the solid lines in FIG. 4, in step ST1, the travel control device 12 of the automobile 2 acquires vehicle information regarding the subject vehicle. In step ST2, the travel control device 12 transmits the vehicle information to the server apparatus 3 as the travel information regarding the subject vehicle. In addition, in step ST4, the travel control device 12 generates the control value for the travel control by using the vehicle information regarding the subject vehicle acquired in step ST1. In step ST5, the travel control device 12 executes the travel control of the subject vehicle. The travel control device 12 of the automobile 2 periodically executes such an autonomous travel control, as illustrated in FIG. 4 in which steps ST1 to ST5 are repeated. Thus, it is possible for the travel control device 12 to check the latest travel state and keep on controlling the travel of the subject vehicle to cope with the travel state at each timing.

In the server apparatus 3, upon receiving new travel information from each automobile 2, in step ST14, the pre-processor 41 calculates a position on the lane (hereinafter, referred to as a vehicle S-position) of the automobile 2. In addition, the pre-processor 41 reads the server map data 51. In step ST17, the pre-processor 41 generates a vehicle behavior plan for the automobile 2 in accordance with, for example, a shape of the road 90. In step ST18, the pre-processor 41 records the vehicle behavior plan generated, in the vehicle position behavior DB 53. The pre-processor 41 repeats the processes in steps ST14 to ST18 every time new travel information is received from each automobile 2. Thus, the vehicle position behavior DB 53 holds the vehicle behavior plan corresponding to the latest travel state of each of the multiple automobiles 2. Here, the vehicle behavior plan may include information such as acceleration, speed keeping, deceleration, a stop, the speed range (the upper limit and the lower limit), lane keeping, or a lane change of each automobile 2.

In the server apparatus 3, in step ST21, the control information generator 42 periodically reads information from the vehicle position behavior DB 53. In step ST23, the control information generator 42 determines interference of each automobile 2. In step ST24, the control information generator 42 generates the individual control information corresponding to the interference. In step ST25, the control information generator 42 transmits the individual control information to each automobile 2. In this case, the travel control device 12 of the automobile 2 is able to control the travel of the subject vehicle by generating the control value to basically follow the individual control information, by using the latest individual control information acquired from the server apparatus 3 together with the vehicle information regarding the subject vehicle acquired in step ST1.

Note that, even after the automobile 2 controls the travel of the subject vehicle basically following the individual control information, there is possibility that the travel state of the automobile 2 is short of favorable suppression of, for example, the interference. In such a case, the server apparatus 3 generates and transmits the next piece of the individual control information including a similar request to the previous one. By repeating the travel control following the individual control information including the similar request, the travel of the automobile 2 is expected to approach the travel state following a determination result as to the interference or the like in the server apparatus 3, and enter the relevant travel state.

In addition, in the traffic control system 1, the server apparatus 3 includes the emergency processor 43, separately from the pre-processor 41 and the control information generator 42 constantly implemented for the traffic control described above. The emergency processor 43 is implemented only when, from the automobile 2 that is to perform emergency evacuation to the road shoulder, the travel information including that information is received. A control involving the emergency processor 43 is described in detail below.

Figure 5:
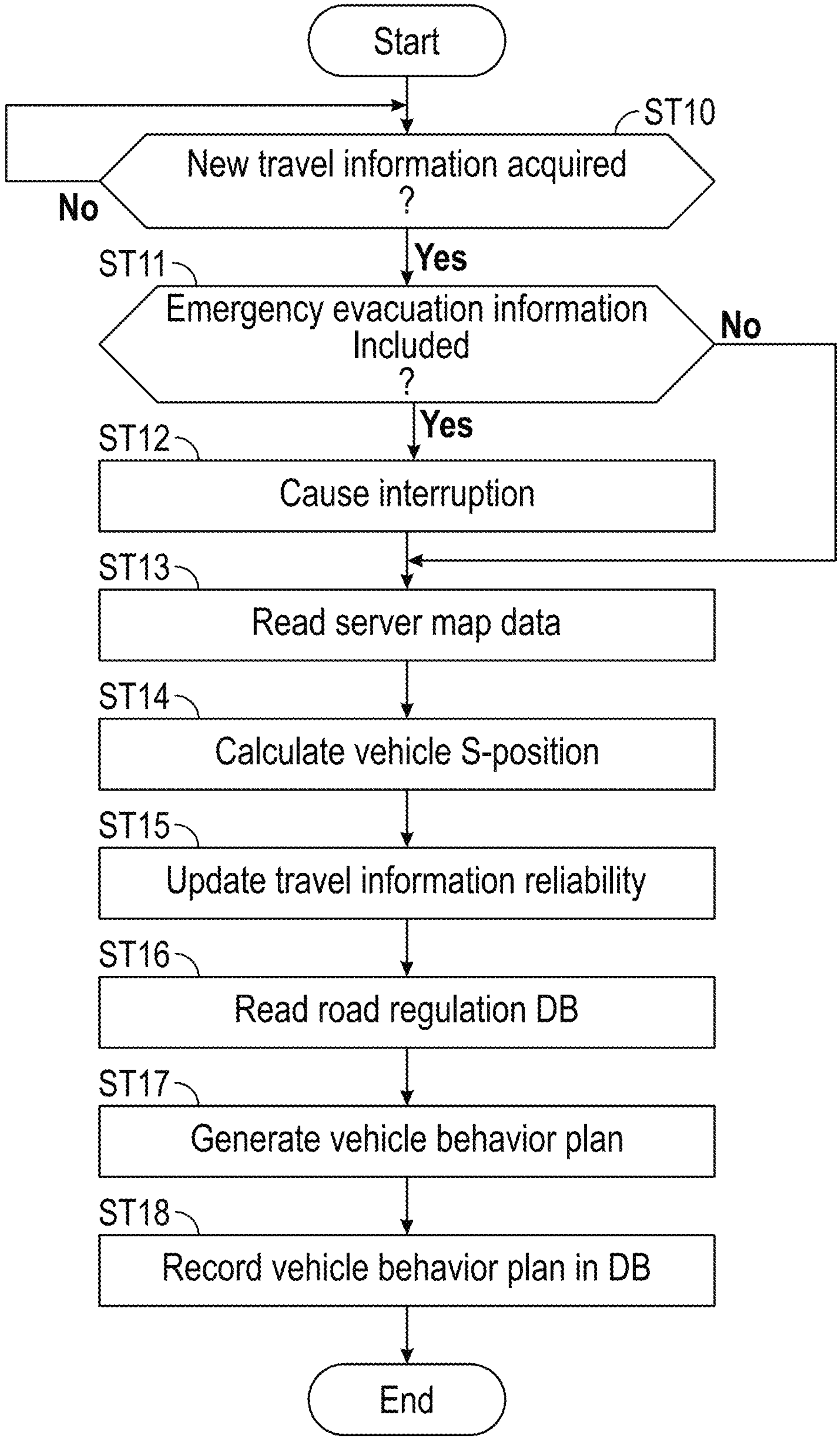
FIG. 5 is a flowchart of a pre-processing control by a server CPU in FIG. 2.

FIG. 5 is a flowchart of a pre-processing control by the server CPU 34 in FIG. 2.

The server CPU 34 repeatedly executes the pre-processing control in FIG. 5 as the processing by the pre-processor 41.

In step ST10, the pre-processor 41 determines whether new travel information has been received and acquired by the server communication device 31. When no new travel information has been acquired, the pre-processor 41 repeats this process. Upon acquiring new travel information, the pre-processor 41 causes the flow to proceed to step ST11.

In step ST11, the pre-processor 41 determines whether the automobile 2 is to perform emergency evacuation to the road shoulder in the new travel information. The pre-processor 41 may determine whether the travel information newly acquired in step ST10 includes information indicating emergency evacuation to the road shoulder. When information indicating emergency evacuation to the road shoulder is included, the pre-processor 41 causes the flow to proceed to step ST12. When information indicating emergency evacuation to the road shoulder is not included, the pre-processor 41 causes the flow to proceed to step ST13.

In step ST12, the pre-processor 41 causes an interruption in the server apparatus 3. In this manner, the pre-processor 41 causes the interruption when the travel information newly received by the server communication device 31 includes information indicating emergency evacuation to the road shoulder. Thereafter, the pre-processor 41 causes the flow to proceed to step ST13.

From step ST13, the pre-processor 41 starts generating information to be recorded in the vehicle position behavior DB 53, for the automobile 2 related to the newly received travel information. The pre-processor 41 first reads the server map data 51.

In step ST14, the pre-processor 41 calculates the vehicle S-position, based on positional information regarding the automobile 2 included in the newly received traveling information and the server map data 51. The vehicle S-position indicates the lane on which the automobile 2 related to the travel information is traveling, and the position on the lane.

In step ST15, the pre-processor 41 updates reliability of the newly received travel information. For example, when travel information is periodically received at intervals equal to or less than a predetermined threshold time, from the automobile 2 from which the travel information has been received, the pre-processor 41 updates the reliability to high reliability. In contrast, when travel information is received, for example, intermittently and not periodically, the pre-processor 41 updates the reliability to a lower one. In this case, the reliability decreases stepwise as a state where travel information is received intermittently continues.

In step ST16, the pre-processor 41 reads the road regulation DB 52.

In step ST17, the pre-processor 41 generates the vehicle behavior plan for the automobile 2 from which the new travel information has been received, by using the information acquired in the processes by step ST16.

The pre-processor 41 generates the vehicle behavior plan indicating a travel schedule of the automobile 2, basically based on, for example, the vehicle S-position and a route of the automobile 2 from which the new travel information has been received.

For the automobile 2 to be caused to evacuate to the road shoulder, the pre-processor 41 generates the vehicle behavior plan that allows the automobile 2 to travel to the road shoulder of the road 90, while avoiding the road regulation region held in the road regulation DB 52.

The vehicle behavior plan generated by these processes may include, for example, information regarding acceleration of the automobile 2, information regarding speed keeping, information regarding deceleration, information regarding a stop, information regarding the speed range (the upper limit and the lower limit), information regarding lane keeping, information regarding a lane change, and the like.

In step ST18, the pre-processor 41 records the information generated in the processes by step ST17, in the vehicle position behavior DB 53, and updates the vehicle position behavior DB 53. Thereafter, the pre-processor 41 ends this control.

Figure 6:
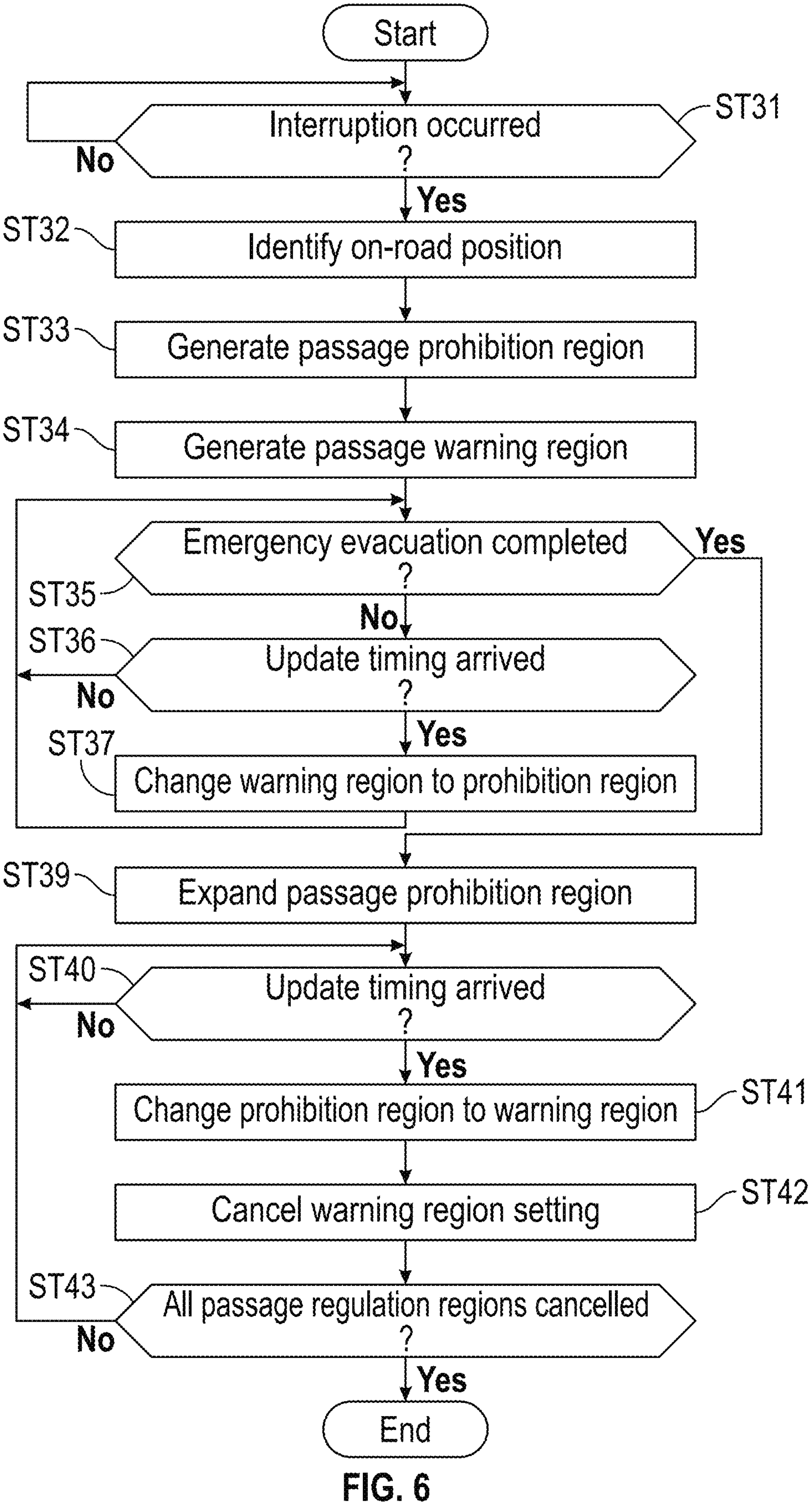
FIG. 6 is a flowchart of an emergency processing control by the server CPU in FIG. 2.

FIG. 6 is a flowchart of an emergency processing control by the server CPU 34 in FIG. 2.

The server CPU 34 executes the emergency processing control in FIG. 6, as the processing by the emergency processor 43.

In step ST31, the emergency processor 43 determines whether an interruption has occurred in the server apparatus 3. The pre-processor 41 causes the interruption in step ST12 of FIG. 5, only when the travel information newly received by the server communication device 31 includes information indicating emergency evacuation of the automobile 2 to the road shoulder. In this case, the emergency processor 43 determines that an interruption has occurred in the server apparatus 3, and causes the flow to proceed to step ST32. In contrast, when no interruption has occurred in the server apparatus 3, the emergency processor 43 repeats this process.

In this manner, by the interruption being caused by the pre-processor 41, the emergency processor 43 is implemented earlier, preferentially over the control information generator 42 that periodically generates the individual control information.

In step ST32, the emergency processor 43 identifies an on-road position of the automobile 2 to be caused to perform emergency evacuation to the road shoulder. The emergency processor 43 may calculate the vehicle S-position as the on-road position.

From step ST33, the emergency processor 43 starts generating the passage regulation region.

First, for the road 90 including the lane on which the automobile 2 to be caused to perform emergency evacuation to the road shoulder is traveling, the emergency processor 43 generates the passage prohibition region 96 that prohibits travel of other vehicles, in at least a region on a rear side in the travel direction with respect to the on-road position of the automobile 2 to be caused to perform emergency evacuation to the road shoulder. The emergency processor 43 records the passage prohibition region 96 in the road regulation DB 52. Here, the passage prohibition region 96 may be, for example, a range with a predetermined length in a direction opposite to the travel direction of the lane, from the vehicle S-position calculated in step ST32. The length of the passage prohibition region 96 may be set to a length that allows the other automobiles to stop before the vehicle S-position, based on, for example, information regarding a speed limit of the lane or the road 90.

In step ST34, for each lane of the road 90 for which the passage prohibition region 96 is set, the emergency processor 43 generates the passage warning region 97 behind the passage prohibition region 96, and records the passage warning region 97 in the road regulation DB 52. Here, the length of the passage warning region 97 may be a predetermined length of, for example, about 1 kilometer, regardless of information such as the information regarding the speed limit of the lane or the road 90.

In step ST35, the emergency processor 43 determines whether the emergency evacuation of the automobile 2 to the road shoulder has been completed. When the automobile 2 has not evacuated to the road shoulder and stopped, the emergency processor 43 determines that the emergency evacuation to the road shoulder has not been completed, and causes the flow to proceed to step ST36. When the automobile 2 has evacuated to the road shoulder and stopped, the emergency processor 43 determines that the emergency evacuation to the road shoulder has been completed, and causes the flow to proceed to step ST39.

In step ST36, the emergency processor 43 determines whether an update timing for the passage regulation region set for emergency evacuation has arrived. The emergency processor 43 may determine whether the update timing has arrived, based on whether a predetermined period has elapsed with respect to a process timing of step ST35 or a previous process timing of previous step ST36. When the update timing has not arrived, the emergency processor 43 causes the flow to return to step ST35. When the update timing has arrived, the emergency processor 43 causes the flow to proceed to step ST37.

In step ST37, the emergency processor 43 updates the passage regulation region set for emergency evacuation. The emergency processor 43 sequentially updates the already set passage warning region 97 to the passage prohibition region 96.

Thereafter, the emergency processor 43 causes the flow to return to step ST35.

Thus, the passage prohibition region 96 is sequentially expanded with elapse of time, in a period until the automobile 2 evacuates to the road shoulder and stops.

In step ST39, the emergency processor 43 updates and expands the passage regulation region set for emergency evacuation. In this case, the emergency processor 43 sets the passage regulation region also beside the automobile 2 that has performed emergency evacuation to the road shoulder and stopped, in addition to the already set passage regulation region. In addition, the emergency processor 43 updates all the passage regulation regions to the passage prohibition region 96.

Thus, the passage prohibition region 96 is set in a range until passing by the automobile 2 that has performed emergency evacuation to the road shoulder and stopped.

In step ST40, the emergency processor 43 determines whether an update timing for the passage regulation region set for emergency evacuation has arrived. The emergency processor 43 may determine whether the update timing has arrived, based on whether a predetermined period has elapsed with respect to a process timing of step ST37 or a previous process timing of previous step ST40. When the update timing has not arrived, the emergency processor 43 repeats this process. Upon arrival of the update timing, the emergency processor 43 causes the flow to proceed to step ST41.

In step ST41, the emergency processor 43 updates the passage regulation region set for emergency evacuation. The emergency processor 43 sequentially updates the set passage prohibition region 96 to the passage warning region 97.

In step ST42, the emergency processor 43 cancels the setting of the passage regulation region set for emergency evacuation. The emergency processor 43 deletes the setting of the set passage warning region 97 from the road regulation DB 52.

Thus, after the automobile 2 evacuates to the road shoulder and stops, in the passage regulation region, the passage prohibition region 96 is sequentially changed to the passage warning region 97, and the setting of the passage warning region 97 is sequentially cancelled.

In step ST43, the emergency processor 43 determines whether all the passage regulation regions set for emergency evacuation have been cancelled. When all the passage regulation regions have not been cancelled, the emergency processor 43 causes the flow to return to step ST40. Upon cancellation of all the passage regulation regions, the emergency processor 43 ends this After such a control by the emergency processor 43, the pre-processor 41 reads the road regulation DB 52 in step ST16 of FIG. 5.

When the road regulation DB 52 holds the passage prohibition region 96, in step ST17, the pre-processor 41 generates the vehicle behavior plan including a request for a stop, for example, for the automobile 2 assumed to travel in a section of the passage prohibition region 96. In step ST18, the pre-processor 41 records the vehicle behavior plan in the vehicle position behavior DB 53.

When the road regulation DB 52 holds the passage warning region 97, in step ST17, the pre-processor 41 generates the vehicle behavior plan including a request for deceleration, for example, for the automobile 2 assumed to travel in a section of the passage warning region 97. In step ST18, the pre-processor 41 records the vehicle behavior plan in the vehicle position behavior DB 53.

In addition, for the automobile 2 to be caused to evacuate to the road shoulder, the pre-processor 41 generates the vehicle behavior plan that allows the automobile 2 to move to the road shoulder and stop, while avoiding the passage prohibition region 96 and the passage warning region 97. In step ST18, the pre-processor 41 records the vehicle behavior plan in the vehicle position behavior DB 53.

Figure 7:
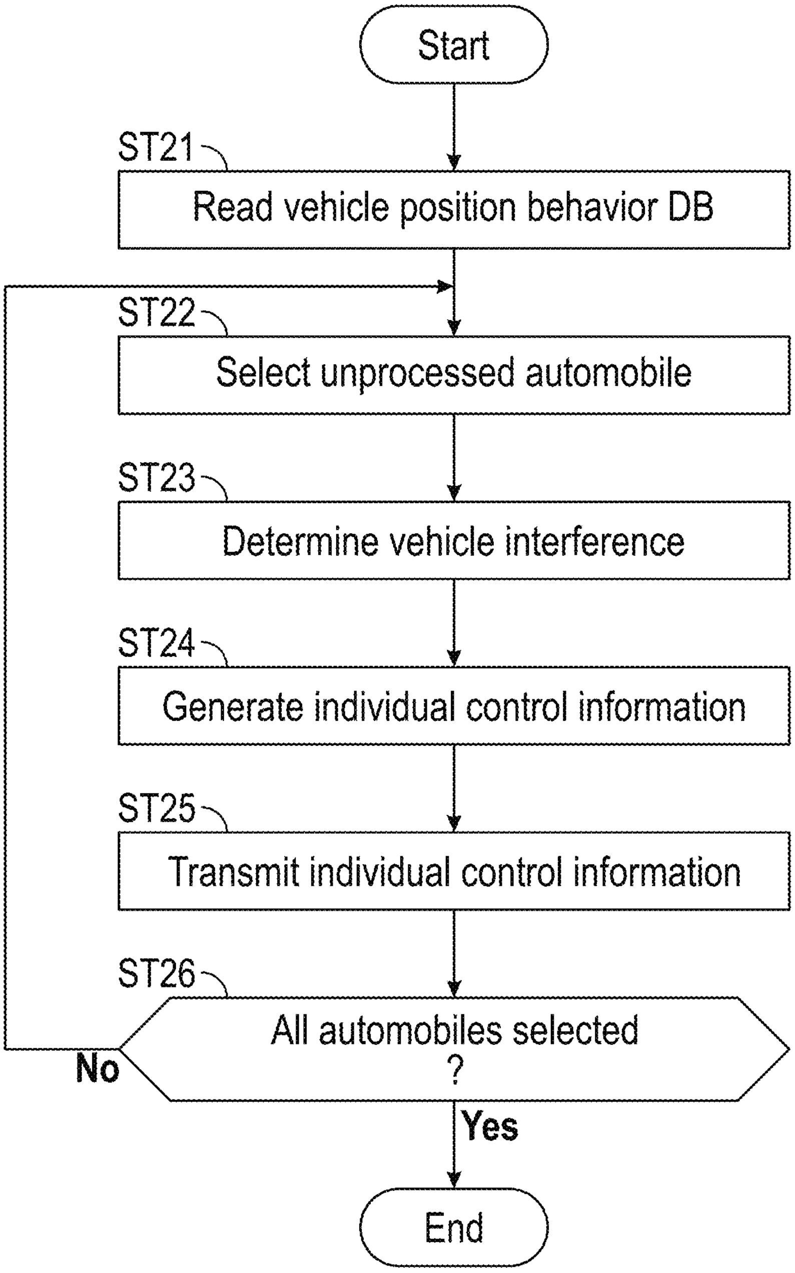
FIG. 7 is a flowchart of a control information generation control by the server CPU in FIG. 2.

FIG. 7 is a flowchart of a control information generation control by the server CPU 34 in FIG. 2.

The server CPU 34 periodically executes the control information generation control in FIG. 7, as the processing by the control information generator 42. Thus, the server CPU 34 continues to periodically transmit the individual control information to the multiple automobiles 2 under the control.

When the interruption has been caused in the processing by the pre-processor 41 in FIG. 5, the server CPU 34 executes the control information generation control in FIG. 7 after executing the emergency processing control in FIG. 6.

In step ST21, the control information generator 42 reads the vehicle position behavior DB 53.

When the automobile 2 parked or stopped on a lane to hinder travel of other automobiles is present, the passage prohibition region 96 and the passage warning region 97 are set around the parked or stopped automobile 2, in the vehicle position behavior DB 53.

In step ST22, the control information generator 42 selects one unprocessed automobile 2 from among the multiple automobiles 2 regarding which the information is held in the vehicle position behavior DB 53.

In step ST23, the control information generator 42 determines presence or absence of the interference of the automobile 2 selected in step ST22 with other automobiles, by using the information held in the vehicle position behavior DB 53.

Here, the interference may include not only that the position of the selected automobile 2 overlaps a position of another automobile, but also that an inter-vehicle distance becomes equal to or smaller than a threshold. For example, as for a subsequent automobile moving at a higher speed than a preceding automobile, there is possibility that the inter-vehicle distance from the subsequent automobile to the preceding automobile becomes equal to or smaller than the threshold depending on a speed difference. The control information generator 42 may determine the presence or absence of such interference regarding, for example, the inter-vehicle distance, by using a threshold or the like.

In step ST24, the control information generator 42 generates the individual control information, regarding the automobile 2 selected in step ST22.

For example, when it is determined that the interference with the preceding automobile is present as described above, the control information generator 42 may generate the individual control information including a request for speed keeping or deceleration, even if the vehicle position behavior DB 53 holds information regarding, for example, acceleration or speed keeping. In contrast, when it is determined that there is no interference with other automobiles, the control information generator 42 may use the information held in the vehicle position behavior DB 53 as it is, to generate the individual control information.

When the road regulation DB 52 holds the passage prohibition region 96, the pre-processor 41 generates the individual control information including a request for a stop, for example, for the automobile 2 assumed to travel in the section of the passage prohibition region 96.

When the road regulation DB 52 holds the passage warning region 97, the pre-processor 41 generates the individual control information including a request for deceleration, for example, for the automobile 2 assumed to travel in the section of the passage warning region 97.

In this manner, the control information generator 42 generates, as the individual control information, information including a request for acceleration, speed keeping, deceleration, a stop, the speed range (the upper limit and the lower limit), lane keeping, or a lane change of each automobile 2, instead of the control value to be used for the travel control by each automobile 2.

In step ST25, the control information generator 42 transmits the individual control information generated in step ST24, from the server communication device 31 to the corresponding automobile 2.

In step ST26, the control information generator 42 determines whether selection has been finished for all the automobiles 2 regarding which the information is held in the vehicle position behavior DB 53. When the selection of all the automobiles 2 has not been finished, the control information generator 42 causes the flow to return to step ST22. In this case, the control information generator 42 repeats the processes from step ST22 to step ST26, and generates and transmits the individual control information regarding the new automobile 2. When the selection of all the automobiles 2 is finished, the control information generator 42 ends this control.

As described above, when the road regulation DB 52 holds the passage regulation region, the control information generator 42 generates and transmits the individual control information for deceleration or a stop, for the automobile 2 that is likely to travel in the passage regulation region. For the automobile 2 that intends to travel in the passage regulation region held in the road regulation DB 52, the control information generator 42 generates and transmits the individual control information for a reduction in the speed as compared with the automobile 2 that is likely to travel in a region regarding which such information is not held.

In addition, for the automobile 2 that is to perform emergency evacuation to the road shoulder, the control information generator 42 generates and transmits the individual control information that allows the automobile 2 to move to the road shoulder and stop, while avoiding the passage regulation region to a front side in the travel direction.

Figure 8:
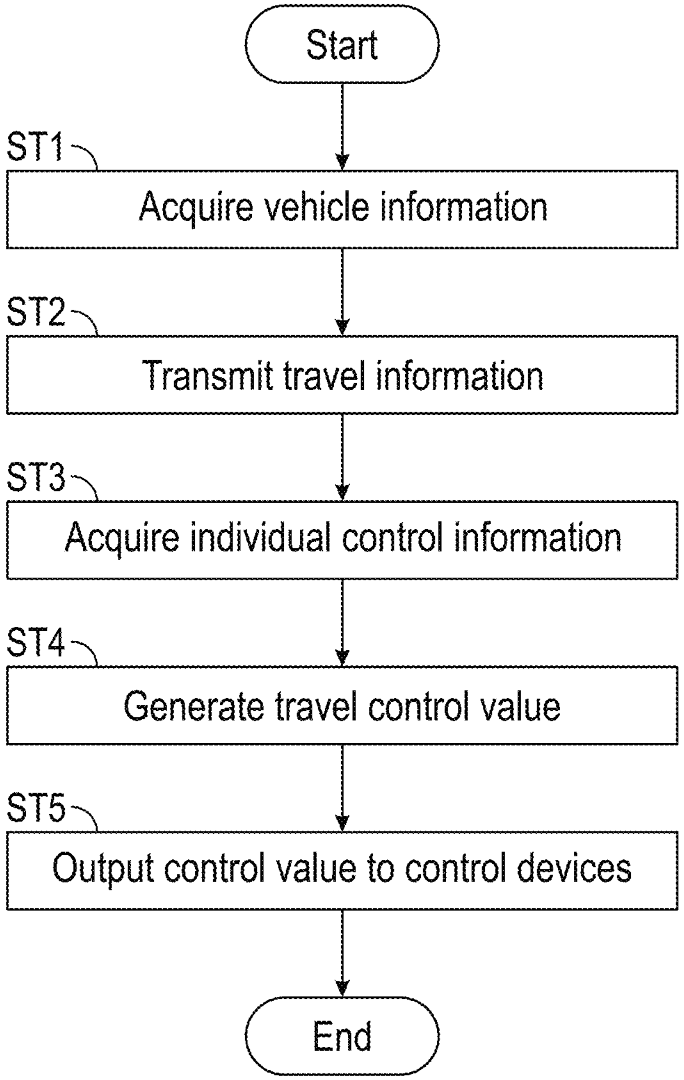
FIG. 8 is a flowchart of a travel control under the traffic control, by a travel control device in FIG. 3.

FIG. 8 is a flowchart of the travel control under the traffic control, by the travel control device 12 in FIG. 3.

The travel control device 12 of each of the multiple automobiles 2 traveling under the control of the server apparatus 3 repeatedly executes the travel control under the traffic control in FIG. 8.

When the travel control device 12 is executing the travel control under the control of the server apparatus 3, the communication device 23 of the relevant automobile 2 normally periodically receives the individual control information from the server apparatus 3. The outside communication control device outputs the individual control information received by the communication device 23 to the travel control device 12 through the vehicle network 17. The travel control device 12 may accumulate and record the individual control information in the memory.

In step ST1, the travel control device 12 collects and acquires the vehicle information such as the information indicating the travel state of the subject vehicle and the information regarding the travel environment around the subject vehicle from, for example, the sensor control device 11 of the subject vehicle. Note that the information to be acquired from, for example, the sensor control device 11 of the subject vehicle may be acquired in advance and held in, for example, the memory of the travel control device 12. Here, the vehicle information may include information regarding, for example, positions, directions, speeds, acceleration rates, and travel directions of the subject vehicle and other vehicles around the subject vehicle included in, for example, the captured image by the in-vehicle camera. The travel control device 12 may process the information acquired from, for example, the sensor control device 11 to generate these pieces of information. In addition, the vehicle information may include, for example, information indicating operation states, control contents, and control results of, for example, the driving control device 13, the steering control device 14, and the braking control device 15. In addition, the vehicle information may include information regarding the time generated by the GNSS receiver 21.

In step ST2, the travel control device 12 transmits the travel information based on the vehicle information acquired in step ST1 to the server apparatus 3 by using the vehicle outside communication control device 16. The vehicle outside communication control device 16 transmits the travel information inputted from the travel control device 12, to the server apparatus 3 through the communication device 23 and the base station 7. Here, the travel information may be any information to be used by the server apparatus 3 in the control. The travel information may be the vehicle information as it is, or may be a portion of the vehicle information. For the traffic control, the server apparatus 3 necessitates information regarding the position of each automobile 2 as minimum information regarding each automobile 2.

In step ST3, the travel control device 12 acquires the latest individual control information acquired from the server apparatus 3.

In step ST4, the travel control device 12 generates the control value to control the travel of the subject vehicle, based on the information acquired by step ST3.

When the individual control information addressed to the subject vehicle is received from the server apparatus 3, the travel control device 12 basically follows the received individual control information addressed to the subject vehicle, and generates the control value for the travel control of the subject vehicle, to correspond to the vehicle information as well.

In contrast, when the individual control information addressed to the subject vehicle is not received from the server apparatus 3, the travel control device 12 generates the control value for the travel control of the subject vehicle, to correspond to the vehicle information.

Thus, the travel control device 12 generates, for example, the control value that causes acceleration of the automobile 2, the control value that causes speed keeping, the control value that causes deceleration, the control value that causes a stop, the control value that causes speed keeping in the speed range (the upper limit and the lower limit), the control value that causes steering for lane keeping, and the control value that causes steering for a lane change.

In step ST5, the travel control device 12 outputs the control value generated in step ST4 to each of the control devices that execute the travel control of the subject vehicle through the vehicle network 17. Thus, for example, the driving control device 13 executes a control to bring a driving output to the control value. The steering control device 14 executes a control to bring the steering angle including a steering direction to the control value. The braking control device 15 executes a control to bring a braking force to the control value.

Thereafter, the travel control device 12 ends this control.

Thus, for example, it is possible for the automobile 2 that is to perform emergency evacuation to the road shoulder to move to the road shoulder and stop, while the avoiding the passage regulation region to the front side in the travel direction.

Next, description is given of a specific example in case where the automobile 2 that is to perform emergency evacuation to the road shoulder occurs in the traffic control system 1 for automobiles described above.

FIG. 9 is an explanatory diagram of a travel environment in which a first automobile 61 traveling on the two-lane road 90 is involved in an emergency situation that necessitates road shoulder evacuation. FIG. 9 illustrates, together with the first automobile 61, a second automobile 62, a third automobile 63, and a fourth automobile 64 that travel based on the individual control information from the server apparatus 3. The second automobile 62 is traveling behind the first automobile 61 in the travel direction (Direction) on the first lane 91. The third automobile 63 is traveling on the second lane 92, side-by-side with the first automobile 61. The fourth automobile 64 is traveling behind the third automobile 63 in the travel direction on the second lane 92.

In FIG. 9, the first automobile 61 transmits the travel information including information indicating emergency evacuation to the road shoulder to the server apparatus 3.

FIG. 10 is an explanatory diagram of the passage regulation region set on the road 90 for the first automobile 61 to evacuate to the road shoulder, after occurrence of the emergency situation in FIG. 9.

In the server apparatus 3, the pre-processor 41 causes an interruption and the emergency processor 43 is implemented, based on the travel information including information indicating emergency evacuation to the road shoulder, regarding the first automobile 61 in FIG. 9. The emergency processor 43 identifies the on-road position of the first automobile 61, and sets the passage prohibition region 96 and the passage warning region 97 serving as the passage regulation region on the first lane 91 and the second lane 92 of the road 90. The set passage regulation information is recorded in the road regulation DB 52.

Here, as an initial setting of the passage regulation region, the emergency processor 43 sets the passage prohibition region 96 and the passage warning region 97, for each of lanes from the first lane 91 on which the first automobile 61 that is to perform emergency evacuation to the road shoulder is present, to the second lane 92 within a range up to the road shoulder of the road 90.

The passage prohibition region 96 of the first lane 91 is set to extend from the on-road position of the first automobile 61 that is to perform emergency evacuation to the road shoulder, up to a position on the rear side in the travel direction.

The passage prohibition region 96 of the second lane 92 is set to extend from a position beside the first automobile 61 that is to perform emergency evacuation to the road shoulder, up to a position on the rear side in the travel direction as with the passage prohibition region 96 of the first lane 91.

The passage warning region 97 of the first lane 91 is set to extend behind the passage prohibition region 96 of the first lane 91 in the travel direction.

The passage warning region 97 of the second lane 92 is set to extend behind the passage prohibition region 96 of the second lane 92 in the travel direction. The passage warning region 97 may be set with a length of, for example, about 1 kilometer.

Based on these pieces of lane regulation information, the server apparatus 3 generates the individual control information for deceleration or a stop, for the second automobile 62 and the fourth automobile 64 traveling behind. The second automobile 62 and the fourth automobile 64 decelerate and stop to be prevented from passing through at least the passage prohibition region 96. In this manner, in the initial setting of the passage regulation region, the emergency processor 43 sets the passage prohibition region 96 and the passage warning region 97, for the first lane 91 on which the first automobile 61 that is to perform emergency evacuation is present to the second lane 92 to be used by the first automobile 61 to evacuate to the road shoulder. The passage prohibition region 96 is set at least on the rear side in the travel direction, with respect to the position of the first automobile 61 that is to perform emergency evacuation. The passage warning region 97 is set behind the passage prohibition region 96 in the travel direction. In a lane direction, the emergency processor 43 sets the passage regulation region for the prohibition or suppression of the travel of other vehicles, to include at least a range on the rear side in the travel direction with respect to the identified position of the first automobile 61.

FIG. 11 is an explanatory diagram of the road shoulder evacuation of the first automobile 61 in a state where the passage regulation region in FIG. 10 is set.

After the passage regulation region in FIG. 10 is set, the control information generator 42 generates and transmits the individual control information also for the automobile 2 that is to perform emergency evacuation to the road shoulder. At this time, the control information generator 42 generates and transmits the individual control information that allows the automobile 2 to move to the road shoulder and stop, while avoiding the passage regulation region to the front side in the travel direction, as illustrated in FIG. 10. Thus, it is possible for the first automobile 61 to travel toward the road shoulder of the road 90 beside the second lane 92, and stop at the road shoulder of the road 90.

FIG. 12 is an explanatory diagram of a state where the passage regulation region in FIG. 10 is updated.

After setting the passage regulation region in FIG. 10, the emergency processor 43 updates the setting of each passage regulation region already set. In FIG. 12, the passage warning region 97 of the first lane 91 and the passage warning region 97 of the second lane 92 are both updated to the passage prohibition region 96.

In this manner, after the initial setting of the passage regulation region, the emergency processor 43 sequentially updates, based on elapse of time, a section for which the passage warning region 97 has been set in the initial setting to the passage prohibition region 96.

The second automobile 62 and the fourth automobile 64 stop in the passage prohibition region 96 whose setting has been updated. It is possible to prevent other automobiles from traveling around the first automobile 61 stopped at the road shoulder of the road 90. In addition, it becomes less likely for other automobiles stopped on the road 90 to crowd around the first automobile 61. Because the other automobiles stopped are not crowded on the road 90, an emergency vehicle is expected to smoothly reach the first automobile 61 by threading its way through such other automobiles.

FIG. 13 is an explanatory diagram of the passage regulation region expanded by update after the first automobile 61 evacuates to the road shoulder.

When the automobile 2 that is to perform emergency evacuation to the road shoulder actually stops at the road shoulder of the road 90, the emergency processor 43 executes processing for resumption of passage on the road 90.

The emergency processor 43 first expands the passage regulation region. Here, the emergency processor 43 extends the passage prohibition region 96 already set for the first lane 91 and the second lane 92, to beside the first automobile 61 stopped at the road shoulder.

Here, the second automobile 62 and the fourth automobile 64 are stopped on the road 90.

FIG. 14 is an explanatory diagram of a state where the expanded passage regulation region in FIG. 13 is updated.

After expanding the passage regulation region, the emergency processor 43 sequentially updates, based on elapse of time, the set multiple passage prohibition regions 96 to the passage warning region 97, in order from the passage prohibition region 96 on the rear side in the travel direction.

In FIG. 14, the passage prohibition region 96 on the rear side in the travel direction is updated to the passage warning region 97.

It becomes possible for the second automobile 62 and the fourth automobile 64 stopped in the passage warning region 97 to resume the travel.

FIG. 15 is an explanatory diagram of a state where the passage regulation region in FIG. 14 is further updated.

When time elapses from the time in FIG. 14, the emergency processor 43 further updates the set passage prohibition region 96 to the passage warning region 97 sequentially, in order from the passage prohibition region 96 on the rear side in the travel direction.

In FIG. 14, all the passage prohibition regions 96 are updated to the passage warning region 97.

In addition, the emergency processor 43 deletes the passage warning region 97 resulting from the update in the previous processing from the road regulation DB 52. Thus, the setting of the passage warning region 97 is sequentially cancelled.

It becomes possible for the second automobile 62 and the fourth automobile 64 to travel without regulation on the travel.

FIG. 16 is an explanatory diagram of a state where all the passage regulation regions in FIG. 15 are cancelled by update.

When time elapses from the time in FIG. 15, the emergency processor 43 deletes all the passage warning regions 97 from the road regulation DB 52.

It becomes possible for the second automobile 62 and the fourth automobile 64 to travel to pass by the first automobile 61 stopped at the road shoulder.

Note that, in the example of FIGS. 9 to 16, the emergency processor 43 sets the passage prohibition region 96 for all the first lane 91 and the second lane 92, in the initial setting of the passage regulation region.

In another example, the emergency processor 43 may set the passage prohibition region 96 for only the first lane 91 on which the first automobile 61 is traveling, in the initial setting of the passage regulation region. Even in this case, it is possible to update the passage warning region 97 of the second lane 92 to the passage prohibition region 96, with subsequent elapse of time.

In addition, upon occurrence of an event in which not the first automobile 61 but the third automobile 63 performs emergency evacuation to the road shoulder, the emergency processor 43 may basically set the passage regulation information for only the second lane 92. Note that, also in this case, the emergency processor 43 may set the passage regulation information for both the first lane 91 and the second lane 92. The emergency processor 43 may set the passage regulation information also for an oncoming lane having an opposite travel direction.

In addition, the emergency processor 43 may update the passage regulation region of the first lane 91 and the passage regulation region of the second lane 92 side by side in a lane width direction at different timings, instead of updating them at the same timing.

For example, the emergency processor 43 may execute update to the passage warning region 97 and cancellation of the setting of the passage warning region 97, in order from the lane farthest from the road shoulder at which the first automobile 61 that is to perform emergency evacuation is stopped.

As described above, the present embodiment uses the server apparatus 3 to control the travel of the multiple automobiles 2. Each of the multiple automobiles 2 includes the travel control device 12 that generates the control value to control the travel of the automobile 2 as the subject vehicle.

In addition, the server apparatus 3 generates the individual control information regarding each of the multiple automobiles 2 based on the travel information regarding the multiple automobiles 2, and transmits the individual control information to the multiple automobiles 2. When the travel control device 12 of each of the multiple automobiles 2 receives the individual control information addressed to the subject vehicle from the server apparatus 3, the travel control device 12 of each of the multiple automobiles 2 generates the control value for the travel control of the subject vehicle by using the received individual control information addressed to the subject vehicle. In this manner, by utilizing the travel control device 12 provided in the multiple automobiles 2, it is possible for the server apparatus 3 to perform the traffic control on the travel of the multiple automobiles 2, without generating the individual control value different between the automobiles 2 regarding the multiple automobiles 2. Even if the control range of the server apparatus 3 widens or the number of the automobiles 2 to be controlled increases, it is possible for the server apparatus 3 to perform the traffic control on the travel of the multiple automobiles 2 with a lower processing load, as compared with a case of generating the individual control value for each automobile 2.

Moreover, the server apparatus 3 in the present embodiment includes the server DB 5 that accumulates and holds the travel information regarding each of the multiple automobiles 2. The pre-processor 41 of the server apparatus 3 records, when the server communication device 31 receives the travel information, the information regarding at least the travel position of the automobile 2 related to the travel information in the server DB 5. In addition, the control information generator 42 of the server apparatus 3 periodically generates the individual control information regarding each of the multiple automobiles 2, by using the information held in the server DB 5. In contrast, the emergency processor 43 of the server apparatus 3 is implemented when the travel information received by the server communication device 31 includes information that hinders travel of other automobiles. Accordingly, when no situation that hinders the travel of the automobiles 2 has occurred, the pre-processor 41 and the control information generator 42 are implemented in the server apparatus 3. Periodic processing in a normal operation of the server apparatus 3 increases or decreases in accordance with the number of the automobiles 2 to be controlled. A processing capability of the server apparatus 3 is easily determinable based on the number of the automobiles 2 assumed in its control range. In addition, it is expected to be possible for the server apparatus 3 to stably keep generating, without failure, the individual control information regarding each of the multiple automobiles 2.

Upon occurrence of the automobile 2 that is to perform the emergency evacuation to the road shoulder, it is possible for the server apparatus 3 in the present embodiment to implement the emergency processor 43 based on the travel information received by the server communication device. The emergency processor 43 that is implemented when the automobile 2 that is to perform the emergency evacuation to the road shoulder is present identifies the on-road position of the automobile 2 that is to perform the emergency evacuation to the road shoulder, and records and sets the passage regulation region for prohibition or suppression of travel of other vehicles in the server DB 5, for at least the range including the rear side in the travel direction with respect to the identified on-road position of the automobile 2. In addition, the control information generator 42 generates and transmits the individual control information for deceleration or a stop, for the automobile 2 that is likely to travel in the passage regulation region held in the server DB 5. It is possible for the travel control device 12 of the automobile 2 that is likely to travel in the passage regulation region to generate the control value for the travel control of the subject vehicle, in accordance with a traffic control request received from the server apparatus 3. For example, it is possible for the travel control device 102 of the automobile 2 involved in a situation that hinders the travel of the subject vehicle to control the travel of the subject vehicle for deceleration or a stop, to cope with the situation. The automobile 2 that is likely to travel in the passage regulation region is expected to travel in accordance with the passage regulation region held in the server DB 5. In this manner, by the server apparatus 3 setting the passage regulation region and executing the traffic control based on the passage regulation region, it becomes less likely for the other automobiles to pass, by normal travel, by the automobile 2 that is to perform the emergency evacuation.

In addition, even in a case of coping with such a situation that hinders the travel of the automobiles 2, the server apparatus 3 does not have to generate the individual control value for each automobile 2. Processing contents of and the processing load on the server apparatus 3 upon occurrence of the situation that hinders the travel of the automobiles 2 tend not to be excessive as compared with in the normal operation with no situation that hinders the travel of the automobiles 2.

In the present embodiment, for the automobile 2 that is to perform the emergency evacuation to the road shoulder, the control information generator 42 of the server apparatus 3 generates and transmits the individual control information that allows the automobile 2 to move to the road shoulder and stop, while avoiding the passage regulation region held in the server DB 5 to the front side in the travel direction. It is possible for the travel control device 12 of the automobile 2 that is to perform the emergency evacuation to the road shoulder to generate the control value for the subject vehicle to perform the emergency evacuation, in accordance with a traffic control request received from the server apparatus 3. This makes it possible for the automobile 2 that is to perform the emergency evacuation to the road shoulder to travel to evacuate to the road shoulder and stop, under the control of the server apparatus 3.

As described above, the present embodiment makes it possible to achieve the automated driving of the automobile 2, to reduce the processing loads on the automobile 2 and the server apparatus 3 used together with the automobile 2, and to make it possible to cope with the automobile 2 that is to perform emergency evacuation to a road shoulder if any.

Second Embodiment

In the above-described embodiment, the travel control device 12 of the automobile 2 that is to perform emergency evacuation to a road shoulder transmits the travel information including information indicating that to the server apparatus 3, and thereafter receives, from the server apparatus 3, the individual control information that allows the automobile 2 to move to the road shoulder and stop, while avoiding the passage regulation region held in the server DB 5 to the front side in the travel direction. The travel control device 12 executes the travel control for emergency evacuation to the road shoulder, under the traffic control.

In the present embodiment, the travel control device 12 of the automobile 2 that is to perform emergency evacuation to the road shoulder executes, by the autonomous travel control, the travel control for emergency evacuation for the automobile 2 to move while avoiding the passage regulation region held in the server DB 5 to the front side in the travel direction and stop at the road shoulder.

Figure 17:
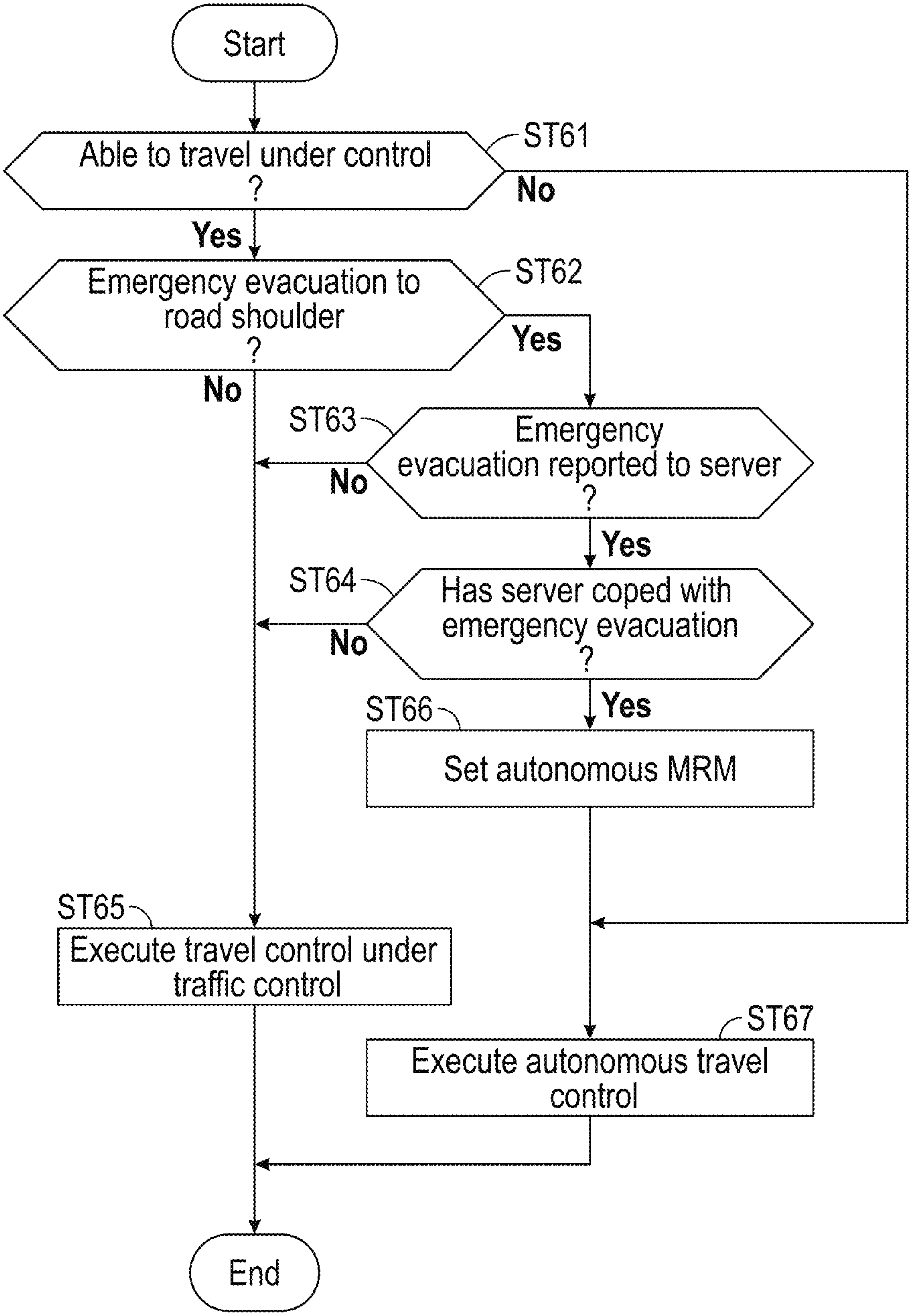
FIG. 17 is a flowchart of a travel switching control to be executed by a travel control device of an automobile in a second embodiment.

FIG. 17 is a flowchart of a travel switching control to be executed by the travel control device 12 of the automobile 2 in the second embodiment.

The travel control device 12 of the automobile 2 repeatedly executes the travel switching control in FIG. 17, including while the automobile is traveling.

The travel control device 12 includes an unillustrated vehicle CPU, and an unillustrated vehicle memory that holds, for example, a program to be executed by the vehicle CPU. By the vehicle CPU executing the program, the travel control device 12 may execute the travel switching control in FIG. 17, under the control or together with the autonomous travel control.

In step ST61, the travel control device 12 determines whether the subject vehicle is able to travel under the control. For example, when the subject vehicle intends to travel under the control, or when the subject vehicle is in a state of being able to travel under the control, the travel control device 12 determines that the subject vehicle is able to travel under the control, and causes the flow to proceed to step ST62. When the travel control device 12 does not determine that the subject vehicle is able to travel under the control, the travel control device 12 causes the flow to proceed to step ST67 for autonomous travel.

In step ST62, the travel control device 12 determines whether the subject vehicle is to perform emergency evacuation to the road shoulder. For example, the physical condition of one of the occupants of the subject vehicle can deteriorate, or a minor malfunction that stills allows for travel can occur in the subject vehicle. Upon occurrence of these emergency situations, the travel control device 12 determines that the subject vehicle is to perform emergency evacuation to the road shoulder, and causes the flow to proceed to step ST63. When the travel control device 12 does not determine that the subject vehicle is to perform emergency evacuation to the road shoulder, the travel control device 12 causes the flow to proceed to step ST65, for the travel control under the control.

In step ST63, the travel control device 12 determines whether it has been reported to the server apparatus 3 that the subject vehicle is to perform emergency evacuation to the road shoulder. For example, when the travel control device 12 has transmitted the travel information regarding the subject vehicle to the server apparatus 3 after occurrence of an event in which the subject vehicle is to perform emergency evacuation to the road shoulder, the travel control device 12 may determine that the report has been made to the server apparatus 3. In this case, the travel control device 12 causes the flow to proceed to step ST64. When the travel control device 12 does not determine that the report has been made to the server apparatus 3, the travel control device 12 causes the flow to proceed to step ST65, to continue the travel control under the control.

In step ST64, the travel control device 12 determines whether the server apparatus 3 has coped with the emergency evacuation of the subject vehicle.

For example, when the traffic control information to be used to cause the subject vehicle to perform emergency evacuation to the road shoulder has been received from the server apparatus 3, the travel control device 12 may determine that the server apparatus 3 has coped with the emergency evacuation of the subject vehicle.

In another example, when a time equal to or greater than a threshold has elapsed after transmitting the travel information regarding the subject vehicle to the server apparatus 3, the travel control device 12 may determine that the server apparatus 3 has coped with the emergency evacuation of the subject vehicle.

In addition, for this determination process, for example, the control information generator 42 of the server apparatus 3 may transmit the passage regulation information held in the server DB 5 to the automobile 2 that has reported emergency evacuation to the road shoulder. In this case, the travel control device 12 that has determined that the subject vehicle is to perform emergency evacuation to the road shoulder may determine whether the server apparatus 3 has coped with the emergency evacuation of the subject vehicle. At this time, the travel control device 12 may determine whether there is a correspondence as in, for example, 10, based on the correspondence between the passage regulation information received from the server apparatus 3 and the position of the subject vehicle.

When the travel control device 12 determines that the server apparatus 3 has coped with the emergency evacuation of the subject vehicle, the travel control device 12 causes the flow to proceed to step ST66, for an autonomous MRM (Minimal Risk Condition).

When the travel control device 12 does not determine that the server apparatus 3 has coped with the emergency evacuation of the subject vehicle, the travel control device 12 causes the flow to proceed to step ST65, to continue the travel control under the control.

In step ST65, the travel control device 12 executes the traffic control on the travel. For example, the travel control device 12 executes the travel control under the traffic control in FIG. 8. Thus, it is possible for the automobile 2 that is to perform emergency evacuation to the road shoulder to perform emergency evacuation to the road shoulder and stop, under the traffic control.

In step ST66, the travel control device 12 executes setting for the autonomous MRM. For example, the travel control device 12 generates a course or the like that causes the subject vehicle to travel toward the road shoulder and stop at the road shoulder. Here, the travel control device 12 may, for example, acquire the passage regulation region held in the server DB 5 from the server apparatus 3, and execute the travel control for emergency evacuation for the automobile 2 to move while avoiding the passage regulation region to the front side in the travel direction and stop at the road shoulder.

In step ST67, the travel control device 12 executes the autonomous travel control. The travel control device 12 executes, for example, the travel control in FIG. 8, except for the process of step ST3. Thus, it is possible for the automobile 2 that is to perform emergency evacuation to the road shoulder to perform emergency evacuation to the road shoulder and stop, by the autonomous travel control regardless of the control.

Note that, in the autonomous travel control or the traffic control for emergency evacuation, the travel control device 12 does not necessarily have to evacuate to the road shoulder of the road. For example, when the lane on which the automobile 2 is traveling has a sufficient width, the travel control device 12 may execute the autonomous travel control for emergency evacuation for the automobile 2 to perform emergency evacuation and stop, to allow another automobile to pass thereby on the lane. When such an automobile 2 by which another automobile is able to pass on the road is stopped, the other automobile assumed to pass by the automobile 2 thereafter may control the travel of the subject vehicle to pass while avoiding the stopped automobile 2, under the traffic control on the travel by the server apparatus 3 or in the autonomous travel control.

As described above, in the present embodiment, the travel control device 12 of the automobile 2 that is to perform emergency evacuation to the road shoulder makes it possible to perform emergency evacuation to the road shoulder and stop, by the autonomous travel control, regardless of the traffic control by the server apparatus 3.

In addition, the server apparatus 3 does not necessarily have to generate the individual control information for emergency evacuation, for the automobile 2 that is to perform emergency evacuation to the road shoulder. The present embodiment is expected to make it possible to reduce the processing load on the server apparatus 3.

The embodiments described above are preferred examples of embodiments of the invention. However, the invention is not limited to those, and various modifications and alternations may be made without departing from the scope of the gist of the invention.

DESCRIPTION OF REFERENCE NUMERALS

1: traffic control system, 2: automobile (vehicle), 3: server apparatus, 4: server main body, 5: server DB, 6: communication system, 7: base station, 8: communication network, 10: control system, 11: sensor control device, 12: travel control device, 13: driving control device, 14: steering control device, 15: braking control device, 16: vehicle outside communication control device, 17: vehicle network, 21: GNSS receiver, 22: vehicle outside camera, 23: communication device, 31: server communication device, 32: server GNSS receiver, 33: server memory, 34: server CPU, 35: internal bus, 41: pre-processor, 42: control information generator, 43: emergency processor, 51: high-precision map data, 52: road regulation DB, 53: vehicle position behavior DB, 61: first automobile, 62: second automobile, 63: third automobile, 64: fourth automobile, 90: road, 91: first lane, 92: second lane, 96: passage prohibition region, 97: passage warning region, S1: first line segment, S2: second line segment

The invention claimed is:

1. A vehicle traffic control system comprising:

vehicles each comprising a travel controller comprising a vehicle processor and a vehicle memory, the vehicle processor being configured to generate a control value to control travel of the vehicle as a subject vehicle; and a server apparatus comprising a server processor, a server memory, and a storage, the server processor being configured to generate individual control information regarding each of the vehicles based on travel information regarding the vehicles, and transmit the individual control information to the vehicles, wherein the vehicle processor of each of the vehicles is configured to, upon receiving the individual control information addressed to the subject vehicle from the server apparatus, generate the control value for a travel control of the subject vehicle by using the received individual control information addressed to the subject vehicle, the storage is configured to accumulate and hold the travel information regarding each of the vehicles, the travel information being received from each of the vehicles, the server processor is configured to:

when the travel information is received from one of the vehicles, record, in the storage, information regarding at least a travel position of the vehicle related to the travel information; and periodically generate the individual control information regarding each of the vehicles by using the information held in the storage, the server processor is further configured to, when the received travel information includes information indicating that the vehicle that has transmitted the travel information is to perform emergency evacuation to a road shoulder, and before periodically generating and transmitting the individual control information, identify an on-road position of the vehicle that is to perform the emergency evacuation to the road shoulder, and record and set a passage regulation region for prohibition or suppression of travel of another vehicle in the storage, for at least a range including a rear side in a travel direction with respect to the identified on-road position of the vehicle, and the server processor is further configured to:

select each of the vehicles regarding which the information is held in the storage;

determine, based on the information held in the storage, whether the selected vehicle is to travel in the passage regulation region held in the storage, and in response to determining that the selected vehicle is to travel in the passage regulation region held in the storage, periodically generate and transmit the individual control information for deceleration or a stop for the selected vehicle.

2. The vehicle traffic control system according to claim 1, wherein the server processor is further configured to generate and transmit, for the vehicle that is to perform the emergency evacuation to the road shoulder, the individual control information that allows the vehicle to move and stop while avoiding the passage regulation region held in the storage to a front side in the travel direction.

3. The vehicle traffic control system according to claim 1, wherein the vehicle processor of the vehicle that is to perform the emergency evacuation to the road shoulder is further configured to transmit the travel information including information indicating that the vehicle is to perform the emergency evacuation to the road shoulder to the server apparatus, and thereafter execute, by an autonomous travel control, the travel control that allows the vehicle to move and stop while avoiding the passage regulation region held in the storage to a front side in the travel direction.

4. The vehicle traffic control system according to claim 1, wherein the server processor is further configured to, in an initial setting of the passage regulation region, record the passage regulation region for the prohibition or suppression of the travel of the other vehicle in the storage to include, in a lane width direction, at least a range from a lane on which the vehicle that is to perform the emergency evacuation to the road shoulder is present to the road shoulder of a road including the lane, and include, in a lane direction, at least a range on the rear side in the travel direction with respect to the identified on-road position of the vehicle.

5. The vehicle traffic control system according to claim 4, wherein in the initial setting of the passage regulation region, the server processor is further configured to, for the lane on which the vehicle that is to perform the emergency evacuation is present to a lane to be used by the vehicle to evacuate to the road shoulder, set a passage prohibition region that prohibits the travel of the other vehicle, at least on the rear side in the travel direction with respect to the identified on-road position of the vehicle that is to perform the emergency evacuation, and set a passage warning region that suppresses the travel of the other vehicle, behind the passage prohibition region in the travel direction.

6. The vehicle traffic control system according to claim 5, wherein the server processor is further configured to, after the initial setting of the passage regulation region, update a section for which the passage warning region has been set in the initial setting from the passage warning region to the passage prohibition region.

7. The vehicle traffic control system according to claim 6, wherein the server processor is further configured to, after the vehicle that is to perform the emergency evacuation evacuates to the road shoulder and stops, set the passage prohibition region also beside the vehicle stopped at the road shoulder, and update the passage prohibition region to the passage warning region, in order from the passage prohibition region on the rear side in the travel direction.

8. The vehicle traffic control system according to claim 2, wherein the server processor is further configured to, in an initial setting of the passage regulation region, record the passage regulation region for the prohibition or suppression of the travel of the other vehicle in the storage to include, in a lane width direction, at least a range from a lane on which the vehicle that is to perform the emergency evacuation to the road shoulder is present to the road shoulder of a road including the lane, and include, in a lane direction, at least a range on the rear side in the travel direction with respect to the identified on-road position of the vehicle.

9. The vehicle traffic control system according to claim 3, wherein the server processor is further configured to, in an initial setting of the passage regulation region, record the passage regulation region for the prohibition or suppression of the travel of the other vehicle in the storage to include, in a lane width direction, at least a range from a lane on which the vehicle that is to perform the emergency evacuation to the road shoulder is present to the road shoulder of a road including the lane, and include, in a lane direction, at least a range on the rear side in the travel direction with respect to the identified on-road position of the vehicle.

10. The vehicle traffic control system according to claim 8, wherein in the initial setting of the passage regulation region, the server processor is further configured to, for the lane on which the vehicle that is to perform the emergency evacuation is present to a lane to be used by the vehicle to evacuate to the road shoulder, set a passage prohibition region that prohibits the travel of the other vehicle, at least on the rear side in the travel direction with respect to the identified on-road position of the vehicle that is to perform the emergency evacuation, and set a passage warning region that suppresses the travel of the other vehicle, behind the passage prohibition region in the travel direction.

11. The vehicle traffic control system according to claim 9, wherein in the initial setting of the passage regulation region, the server processor is further configured to, for the lane on which the vehicle that is to perform the emergency evacuation is present to a lane to be used by the vehicle to evacuate to the road shoulder, set a passage prohibition region that prohibits the travel of the other vehicle, at least on the rear side in the travel direction with respect to the identified on-road position of the vehicle that is to perform the emergency evacuation, and set a passage warning region that suppresses the travel of the other vehicle, behind the passage prohibition region in the travel direction.

12. The vehicle traffic control system according to claim 10, wherein the server processor is further configured to, after the initial setting of the passage regulation region, update a section for which the passage warning region has been set in the initial setting from the passage warning region to the passage prohibition region.

13. The vehicle traffic control system according to claim 11, wherein the server processor is further configured to, after the initial setting of the passage regulation region, update a section for which the passage warning region has been set in the initial setting from the passage warning region to the passage prohibition region.

14. The vehicle traffic control system according to claim 12, wherein the server processor is further configured to, after the vehicle that is to perform the emergency evacuation evacuates to the road shoulder and stops, set the passage prohibition region also beside the vehicle stopped at the road shoulder, and update the passage prohibition region to the passage warning region, in order from the passage prohibition region on the rear side in the travel direction.

15. The vehicle traffic control system according to claim 13, wherein the server processor is further configured to, after the vehicle that is to perform the emergency evacuation evacuates to the road shoulder and stops, set the passage prohibition region also beside the vehicle stopped at the road shoulder, and update the passage prohibition region to the passage warning region, in order from the passage prohibition region on the rear side in the travel direction.

* * * * *